United States Patent
Witt

(10) Patent No.: US 11,279,463 B2
(45) Date of Patent: Mar. 22, 2022

(54) HINGED WING RIBS FOR FABRIC COVERED WINGS AND METHOD FOR FOLDING WINGS

(71) Applicant: Marc Stefan Witt, Emeryville, CA (US)

(72) Inventor: Marc Stefan Witt, Emeryville, CA (US)

(*) Notice: Subject to any disclaimer, the term of this patent is extended or adjusted under 35 U.S.C. 154(b) by 103 days.

(21) Appl. No.: 16/873,572

(22) Filed: May 7, 2020

(65) Prior Publication Data

US 2021/0001973 A1    Jan. 7, 2021

Related U.S. Application Data

(60) Provisional application No. 62/921,783, filed on Jul. 5, 2019.

(51) Int. Cl.
| | | |
|---|---|---|
| *B64C 3/56* | (2006.01) | |
| *B60V 1/08* | (2006.01) | |
| *B64C 3/18* | (2006.01) | |

(52) U.S. Cl.
CPC .................. *B64C 3/56* (2013.01); *B60V 1/08* (2013.01); *B64C 3/185* (2013.01); *B64C 3/187* (2013.01)

(58) Field of Classification Search
CPC ........... B64C 3/56; B64C 3/185; B64C 3/187; B64C 1/063; B64C 2201/102; B60V 1/08
See application file for complete search history.

(56) References Cited

U.S. PATENT DOCUMENTS

| | | | | | |
|---|---|---|---|---|---|
| 1,223,317 | A | * | 4/1917 | Curtiss | B64C 3/56 244/49 |
| 1,808,688 | A | * | 6/1931 | Smith | B64C 3/56 244/49 |
| 4,705,234 | A | * | 11/1987 | Bourn | B64C 35/00 114/288 |
| 2005/0242236 | A1 | * | 11/2005 | Purcell | B64C 5/12 244/87 |
| 2017/0283035 | A1 | * | 10/2017 | Ji | B64C 27/26 |
| 2019/0210709 | A1 | * | 7/2019 | Bousfield | B60F 5/02 |
| 2021/0171185 | A1 | * | 6/2021 | Brwon | B64C 3/185 |

* cited by examiner

*Primary Examiner* — Rodney A Bonnette
(74) *Attorney, Agent, or Firm* — John W Carpenter

(57) ABSTRACT

A flying vehicle comprising a wing ship body having a pair of wing spars secured thereto; and a plurality of hinged wing-rib assemblies disposed along each wing spar that allows the wings to be folded against the body of the flying vehicle. A method for folding or collapsing the wings of a wing-in-ground-effect wing ship comprising providing a wing-in-ground-effect wing ship having a pair of wings, and folding the wings toward and against the body of the wing-in-ground-effect wing ship. A fabric covered wing folding assembly including a pair of wings with each wing having a wing spar and covered by a fabric. A plurality of hinged wing-rib assemblies is disposed along each wing spar that allows the wings to be folded against the body of the aircraft. A method is provided for folding or collapsing the wings of an aircraft.

20 Claims, 24 Drawing Sheets

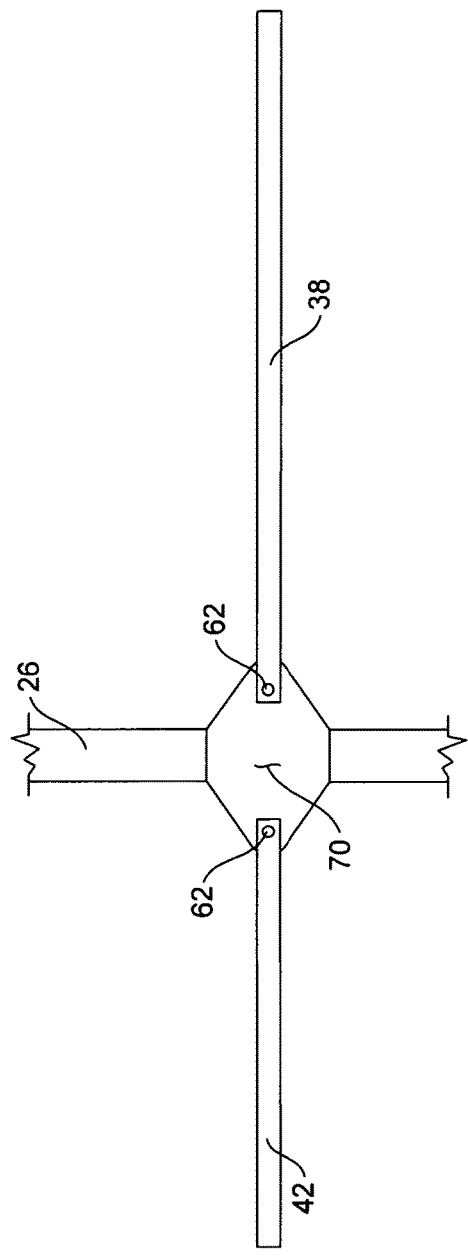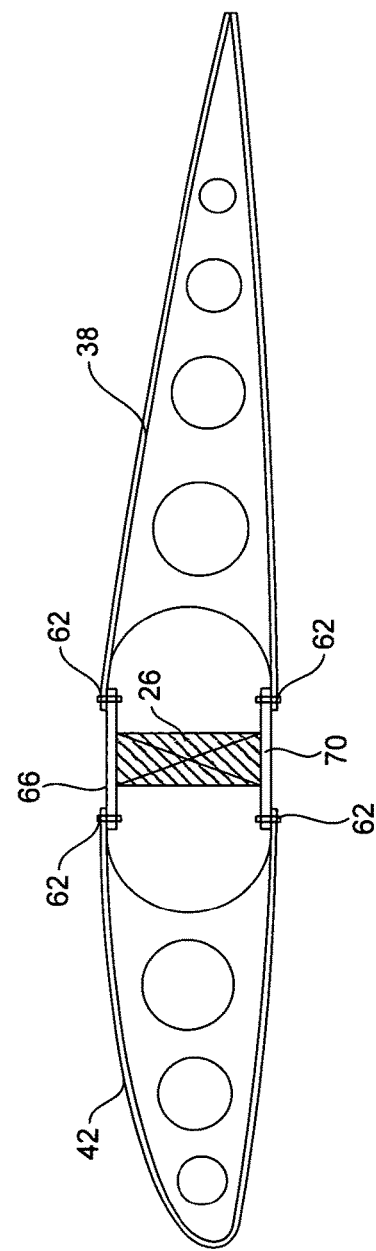

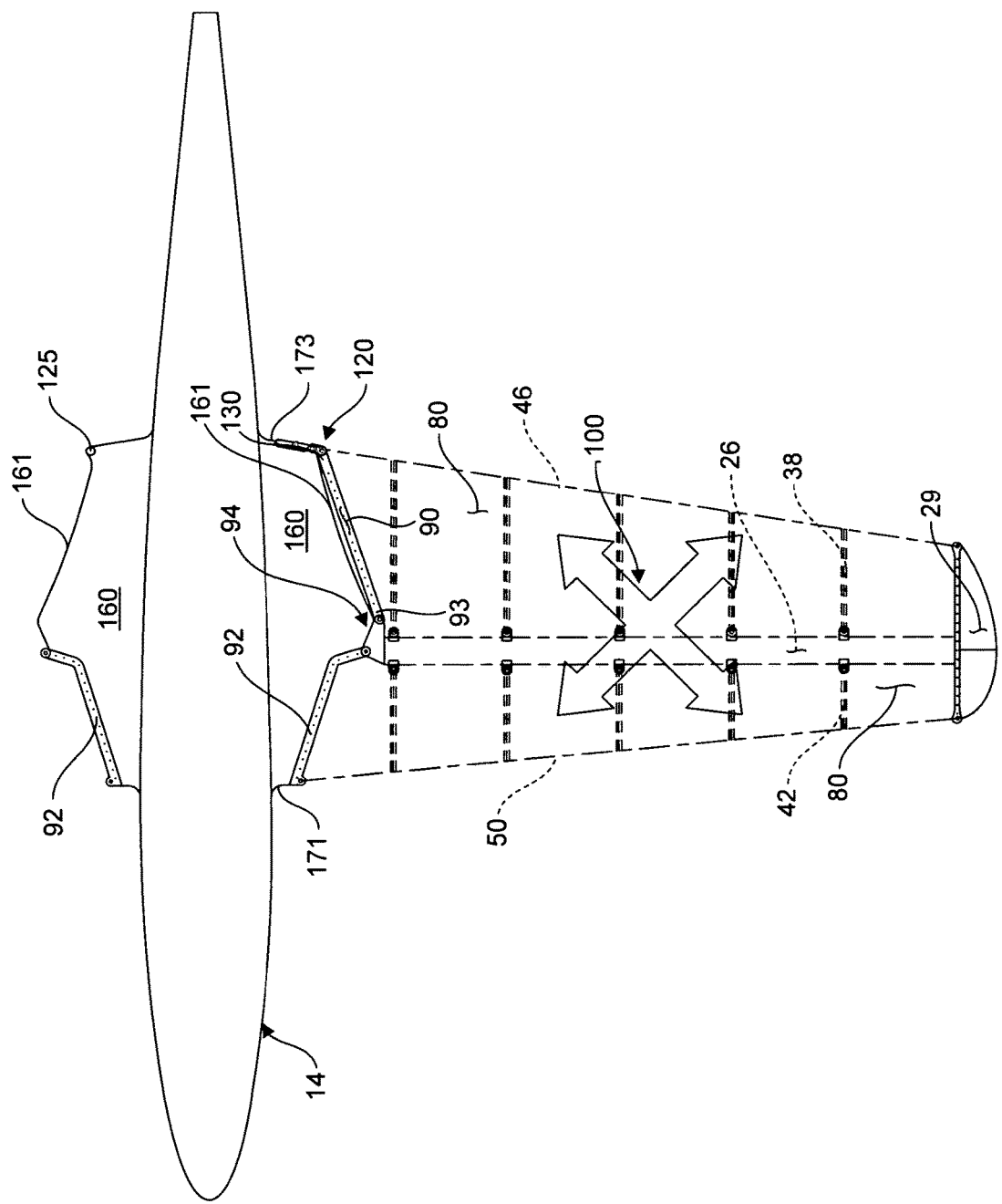

HINGED WING RIBS FOR FABRIC COVERED WINGS AND METHOD FOR FOLDING WINGS

CROSS-REFERENCE TO RELATED APPLICATION

This is a non-provisional, utility patent application related to Provisional Patent Application having application No. 62/921,783, filed Jul. 5, 2019, inventor Marc S. Witt, entitled "Hinged Wing Ribs for Fabric Covered Wings and Method for Folding Wings." Provisional Patent Application having application No. 62/921,783, filed Jul. 5, 2019, is fully incorporated herein by reference thereto as if repeated verbatim immediately herein. All benefits of the Jul. 5, 2019 filing date for the Provisional Patent Application is claimed.

BACKGROUND OF THE INVENTION

1. Field of Invention

The present invention broadly relates in general to fabric covered folding wings. More specifically embodiments of the present invention provide hinged wing-rib assemblies for aircraft (e.g., aircraft lifting bodies, winged watercraft, aerial drones, wing-in-ground-effect wing ships) or any type of vehicle that employs fabric covered wings to allow the folding of the fabric-covered wings to facilitate storage, as well as for easy deployment for use. More specifically further, embodiments provide a method for folding wings for an aircraft.

2. Description of the Background Art

A ground-effect vehicle, also known as a wing-in-ground-effect wing ship, is a vehicle (such as an airplane or a flying boat) that is designed to attain sustained flight over a level surface (e.g., ground or water), by making use of level-surface effect originating from the flat or level ground or water. The lift for the vehicle is caused by the aerodynamic interaction between the wings of the vehicle and a surface. The vehicles are typically intended to operate from and over water like a flying boat.

A typical undesirable feature of most aircraft (e.g., wing-in-ground-effect wing ships, flying boats, airplanes, drones, etc.) is the lack of ability to store the aircraft in a limited space (such as a garage, airport hangars, outdoor parking facilities) because the wings are locked in a steadfast position and are not capable of being folded or collapsed into a more desirable position that would make storage easier. Expensive rental space arrangements limit the volume of commercial products in the aviation markets. Owners have limited space to keep and shelter their aircraft, and there are often only expensive options for shipping the vehicle to new locations.

Thus, what is needed and what has been invented is a folding wing design which allows opportunities for flying vehicles (e.g., wing-in-ground-effect wing ships, flying boats, airplanes, drones, etc.) or aircraft to be used, and stored in the owner's homes, garages or trucks. The flying vehicles or aircraft can also be easily shipped to locations via standard freight methods. What is further needed, and what has been invented, is a wing for wing-in-ground-effect wing ship that employs a plurality of hinge assemblies (i.e., hinged wing-rib assemblies) along the wing spars that allows the wings to be readily folded (a folding rib design where rear wing ribs and front wing ribs pivot toward the wing spar) to facilitate the storage of the wing-in-ground-effect wing ship. What is also further needed and what has been invented is a method for folding or collapsing the wings of a flying vehicles or aircraft, such as a wing-in-ground-effect wing ship.

SUMMARY OF EMBODIMENTS OF THE INVENTION

Embodiments of the present invention provide a wing-in-ground-effect wing ship which utilizes ground effect for attaining and maintaining flight. The wing ship comprises a wing ship body having a pair of wing spars pivotally coupled thereto. A pair of at least one wing-rib assemblies is respectfully coupled to the wing spars. Each wing-rib assembly has a front rib member and a rear rib member. A rear cable is secured to the rear rib members. Similarly, a front cable is secured to the front rib members. The wing spars and the wing rib assemblies are covered with a fabric.

Embodiments of the present invention further provide a method for collapsing fabric-covered wings of an aircraft. The method comprises providing (a) an aircraft including a first fabric-covered wing assembly having at least one first rib assembly supported by a first wing spar, and a second fabric-covered wing assembly having at least one second rib assembly supported by a second wing spar; and (b) decoupling a first cable member of the first fabric-covered wing assembly from a second cable member of the second fabric-covered wing assembly. The method further comprises (1) pivoting at least one front wing rib of the at least one first rib assembly in a first direction (e.g. counter-clockwise); (2) pivoting at least one rear wing rib of the at least one first rib assembly in a second direction (e.g. clockwise) which is a direction opposite to the first direction; (3) pivoting at least one front wing rib of the at least one second rib assembly in the second direction; and (4) pivoting at least one rear wing rib of the at least one second rib assembly in the first direction.

These provisions, together with the various ancillary provisions and features which will become apparent to those skilled in the art as the following description proceeds, are attained by the assemblies and methods of the present invention, preferred embodiments thereof being shown with reference to the accompanying drawings, by way of example only, wherein:

BRIEF DESCRIPTION OF THE DRAWINGS

FIG. 15 is a bottom plan view showing a leading (front) wing rib and a trailing (rear) wing rib pivotally coupled to a bottom hinge plate which is mounted to a wing spar.

FIG. 16 is a side elevational view of a wing spar supporting top and bottom hinge plates, showing the hinge plates pivotally coupled to a trailing (rear) wing rib and a leading (front) wing rib via hinge pins.

FIG. 24 is a top plan view of the embodiment of the wing shown in FIG. 22 being covered with a diagonally woven wing fabric.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
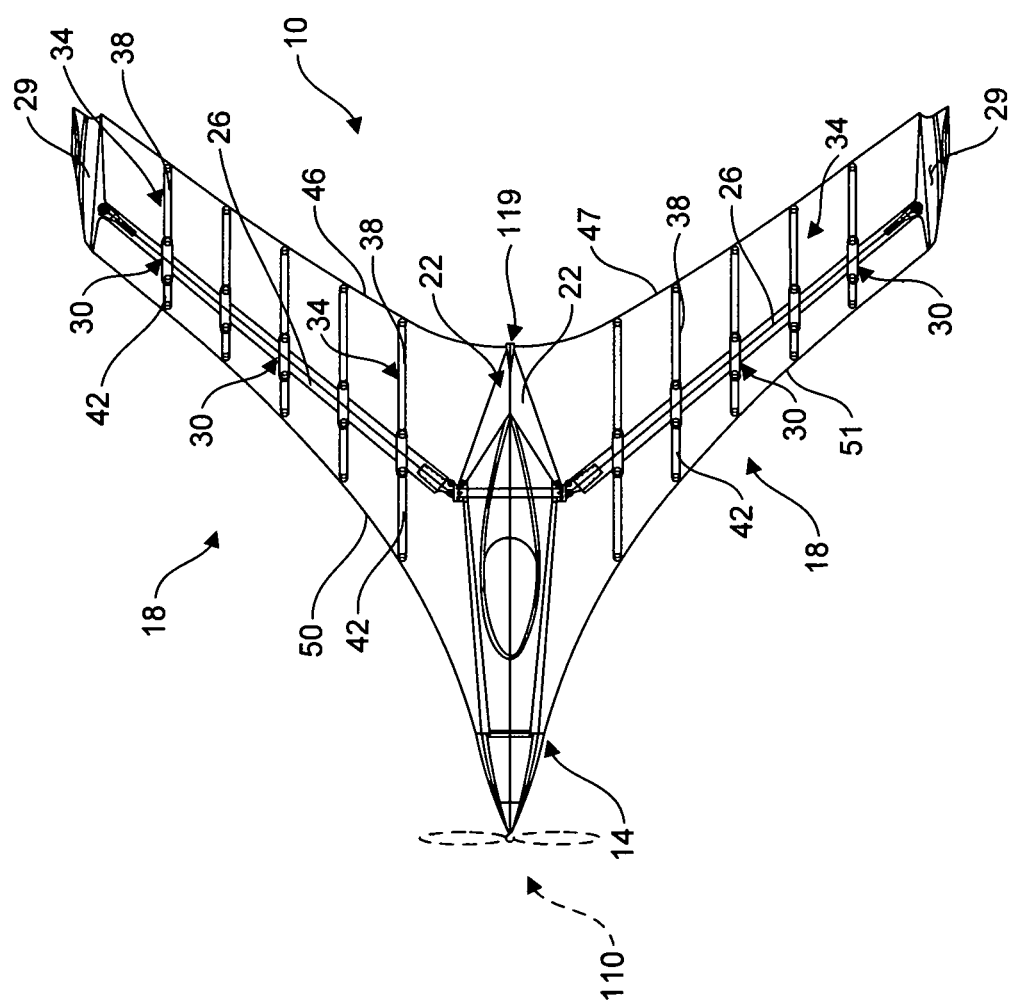
FIG. 1 a top plan view of an embodiment of a flying vehicle in accordance with the present invention.
Figure 2:
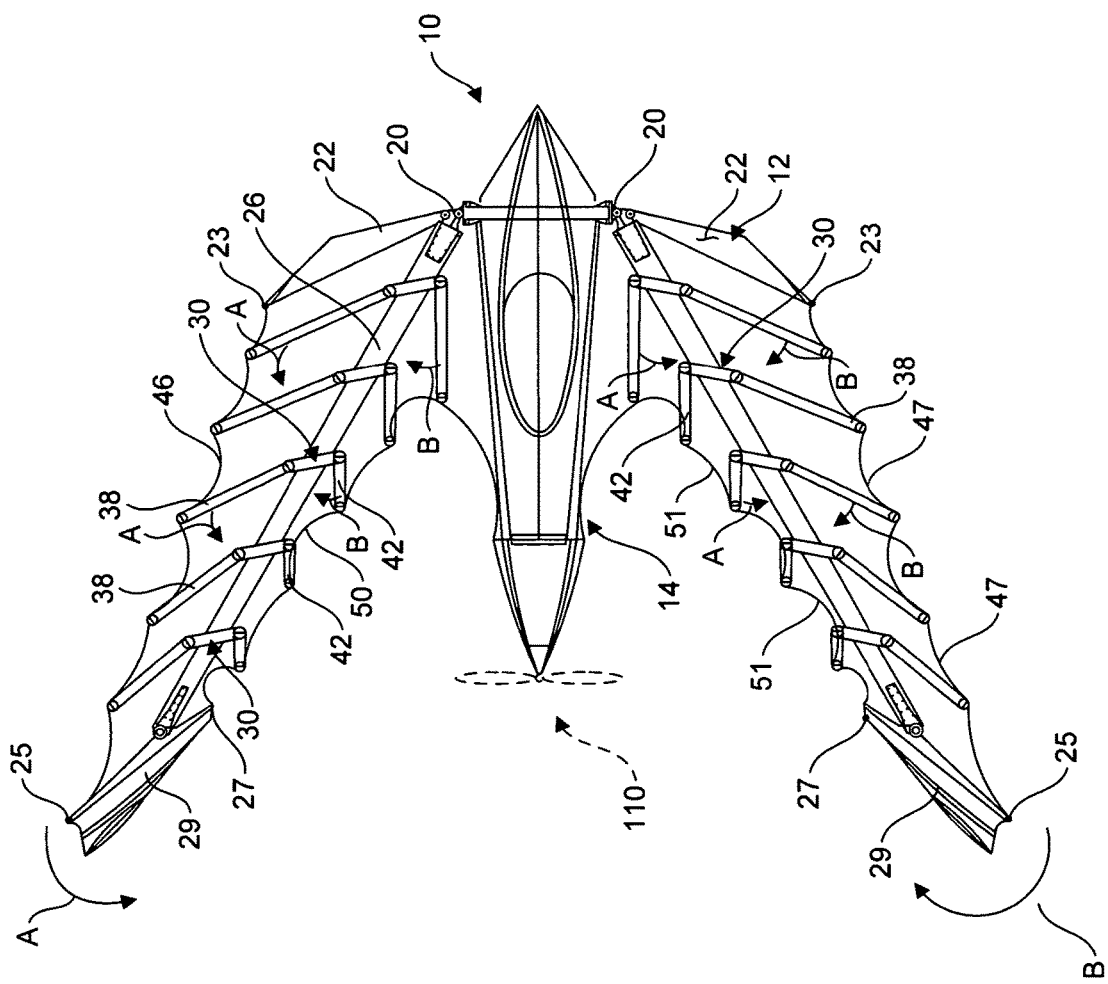
FIG. 2 is a top plan view of the flying vehicle in FIG. 1 with its associated wings being folded towards the front of the body of the flying vehicle after a cable release joint has been unlocked to release the tension on a rear cable.
Figure 3:
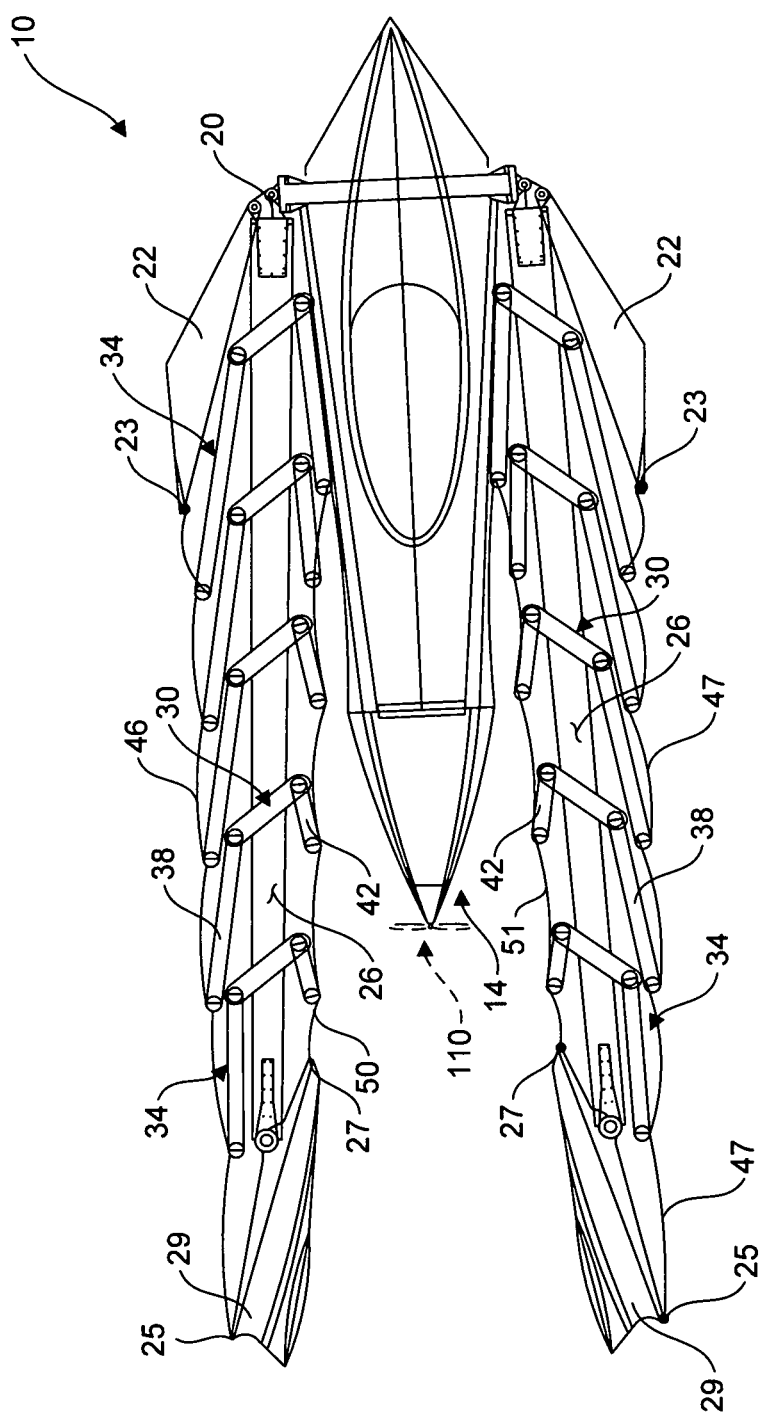
FIG. 3 is a top plan view of the wings of the flying vehicle in FIGS. 1 and 2 after being folded completely forward and against the body of the vehicle.

Referring in detail now to the drawings wherein similar parts or elements of the present invention are identified by like reference numerals, there is seen in FIGS. 1-3 an embodiment of a flying vehicle, generally illustrated as 10. An engine, generally illustrated as 110, may be suitably mounted on the front of the vehicle 10.

Vehicle 10 may be any vehicle or aircraft that is capable of flying or gliding. In a preferred embodiment of the invention, vehicle 10 is a wing-in-ground-effect wing ship which utilizes ground effect to attain level-surface for maintaining flight. Ground effect is the result of the relationship between a lifting wing and the fixed surface underneath the wing. As air is directed downwardly and pressurized by the wing, the fixed surface underneath the wing functions as a boundary for trapping air for maintaining lift.

Vehicle 10 has a body 14, a pair of wings 18-18 and a pair of fuselage arms 22-22 which connect together when the vehicle 10 is placed in a mode for flying as shown in FIG. 1. Each wing 18 includes a wing spar 26 supporting a plurality of hinge assemblies 30. The fuselage arms 22-22 are pivotally coupled to wing spars 26-26. Also pivotally coupled to wing spars 26-26 are wing tip members 29-29. Numeral 20 indicates a pivot location of wing spar 26 on the body 14 of the vehicle 10, as best illustrated in FIGS. 2 and 3.

Figure 10:
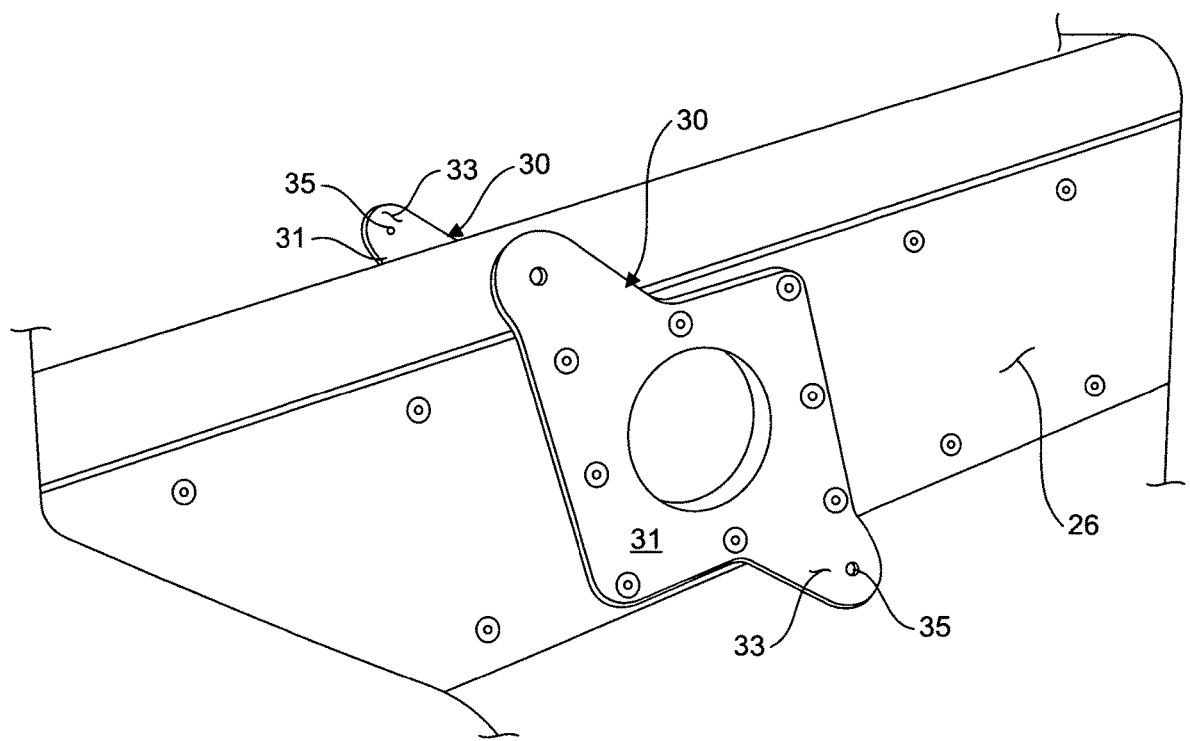
FIG. 10 is a partial perspective view of part of a wing spar supporting a hinge assembly to which front and rear rib assemblies are coupled.
Figure 11:
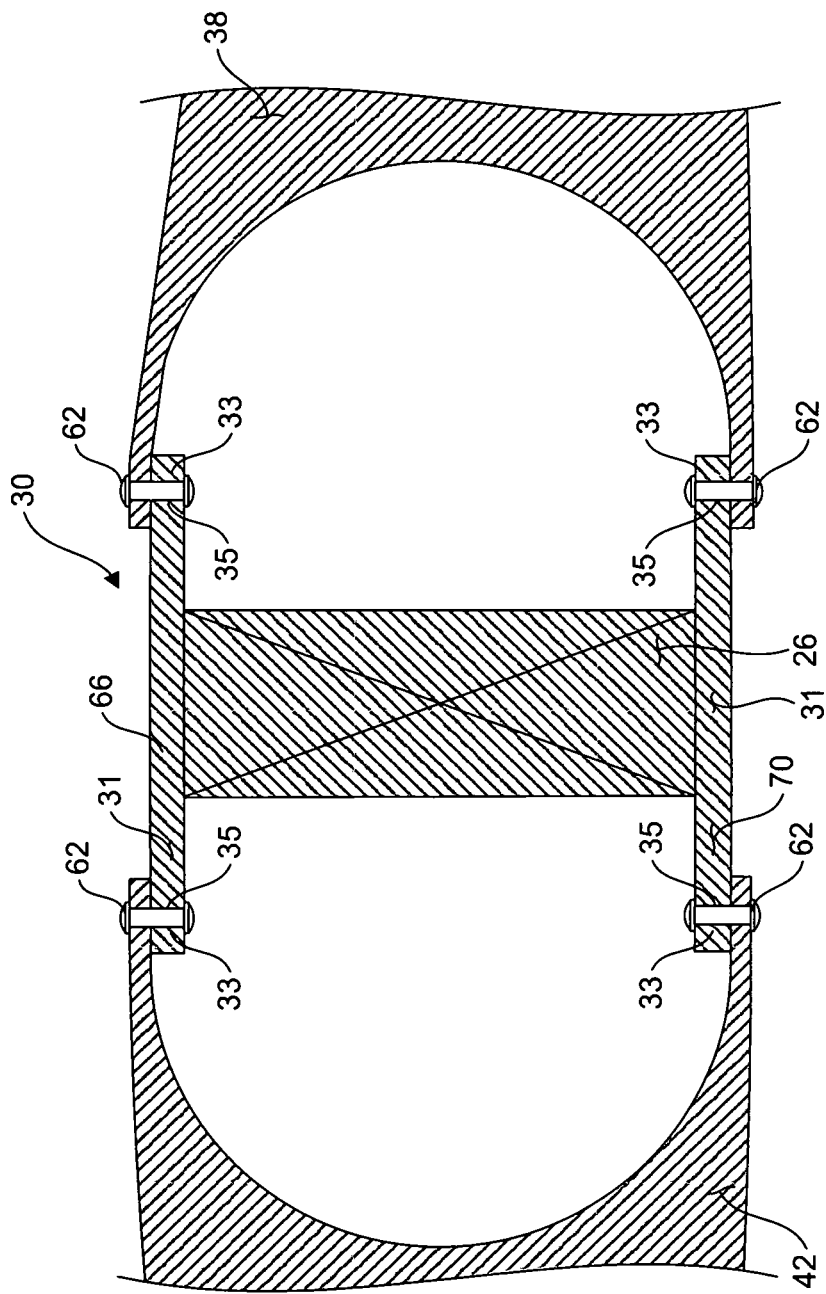
FIG. 11 is a vertical sectional view showing the hinge assembly coupled via hinge pins to the trailing (rear) wing rib and the leading (front) wing rib.
Figure 12:
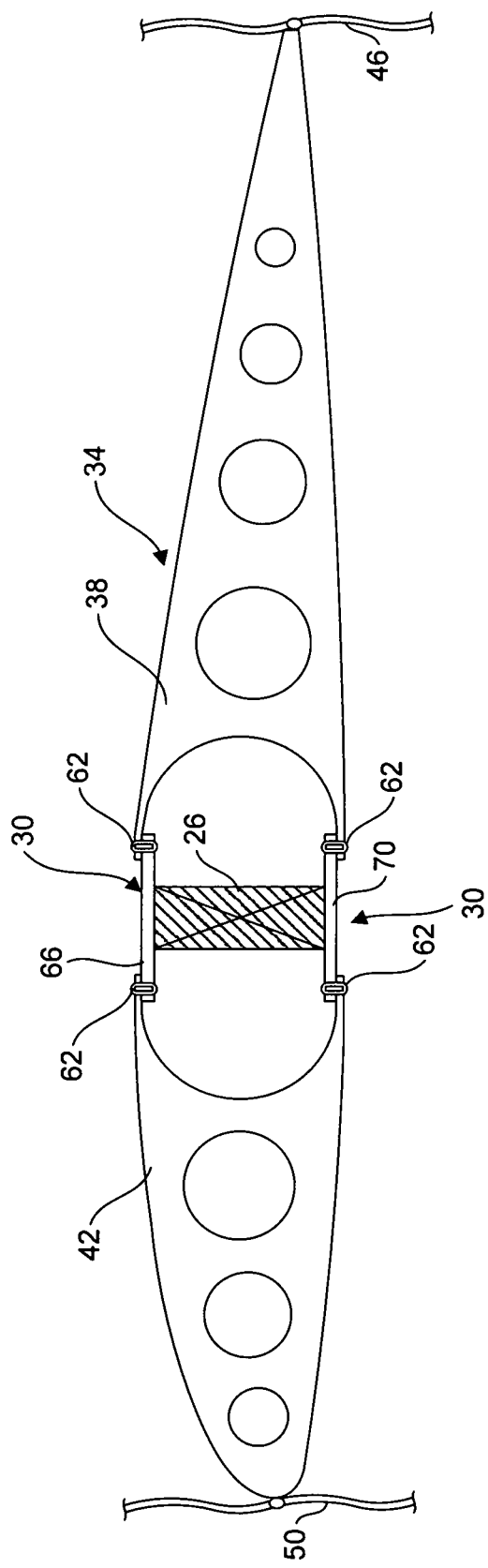
FIG. 12 is another vertical sectional view of a wing spar showing the hinge assembly pivotally coupled to a trailing (rear) wing rib and a leading (front) wing rib via hinge pins.

A preferred embodiment for a hinge assembly 30 is illustrated in FIGS. 10, 11 and 12 where a pair of hinge plates are illustrated, respectively identified as an upper hinge plate 66 and a lower hinge plate 70. Coupled to each hinge assembly 30 is a rib assembly, generally illustrated as 34. Each rib assembly 34 preferably comprises a rear wing rib member 38 and a front wing rib member 42. A preferred embodiment for a rib assembly 34, including a rear wing rib member 38 and a front wing rib member 42, is illustrated in FIGS. 12 and 16.

A pair of cables is associated with each wing 18. As shown in FIGS. 1 and 2, one of the wings 18 has rear cable 46 and front cable 50; and the other wing 18 has rear cable 47 and front cable 51. Rear cables 46 and 47 are secured to an end of the rear wing rib members 38 (as well as to the back end of wing tip members 29-29) in both wings 18-18. Ends of rear cables 46 and 47 are also connected or coupled to fuselage arms 22-22 at points 23-23.

Fuselage arms 22-22 releasably connect together at juncture 119 (see FIG. 1), preferably by any suitable means. Connecting together the fuselage arms 22-22 may be by any suitable connector or connection assembly for releasably securing together the fuselage arms 22-22, which functions to generally simultaneously couple together ends of rear cables 46 and 47 which are connected or coupled to fuselage arms 22-22. In an embodiment of the invention, fuselage arms 22-22 defines and functions as a coupling means for coupling together rear cables 46 and 46. Numerals 23-23 in FIGS. 2 and 3 represent juncture or connection locations or points where ends of rear cables 46 and 47 connect or couple to fuselage arms 22-22. Numerals 25-25 indicate the connection locations where ends of rear cables 46 and 47 connect to wing tip members 29-29. Disconnecting the fuselage arms 22-22 decouples the ends of rear cables 46 and 47.

As illustrated in FIGS. 1-3, front cables 50 and 51 are secured to a leading end of front wing rib members 42 (as well as to the front end of wing tip members 29-29) in both wings 18-18. Ends of front cables 50 and 51 are also connected or coupled to the body of the vehicle 10. Numerals 27-27 in FIGS. 2 and 3 represent juncture or connection locations or points where ends of front cables 50 and 51 connect or couple to the front wing tip members 29-29. As previously indicated, rear cables 46 and 47 are secured to the trailing end of rear wing rib members 38 (as well as to the back end of wing tip members 29-29) in both wings 18-18.

FIG. 2 is a top plan view of the wings 18-18 being folded towards the front of the body 14 after the cable release joint 120 has been unlocked to release the tension on the rear cable 46. When the wings 18-18 are being folded, the wing spars 26-26 are pivoting about a pivot point 20 and are moving towards the front. As the wing spars 26-26 pivot forward, the front wing ribs 42 and the rear wing ribs 38 also start pivoting on hinge assemblies 30, forward and towards the wing spars 26-26 (and towards each other). During the pivoting of the wing spars 26-26 and the ribs 38 and 42, the cables 46, 47, 50 and 51 are collapsing, becoming less taut. As will be seen in other figures, the fabric covering the wings 18-18 becomes less taut, and starts folding.

Figure 4:
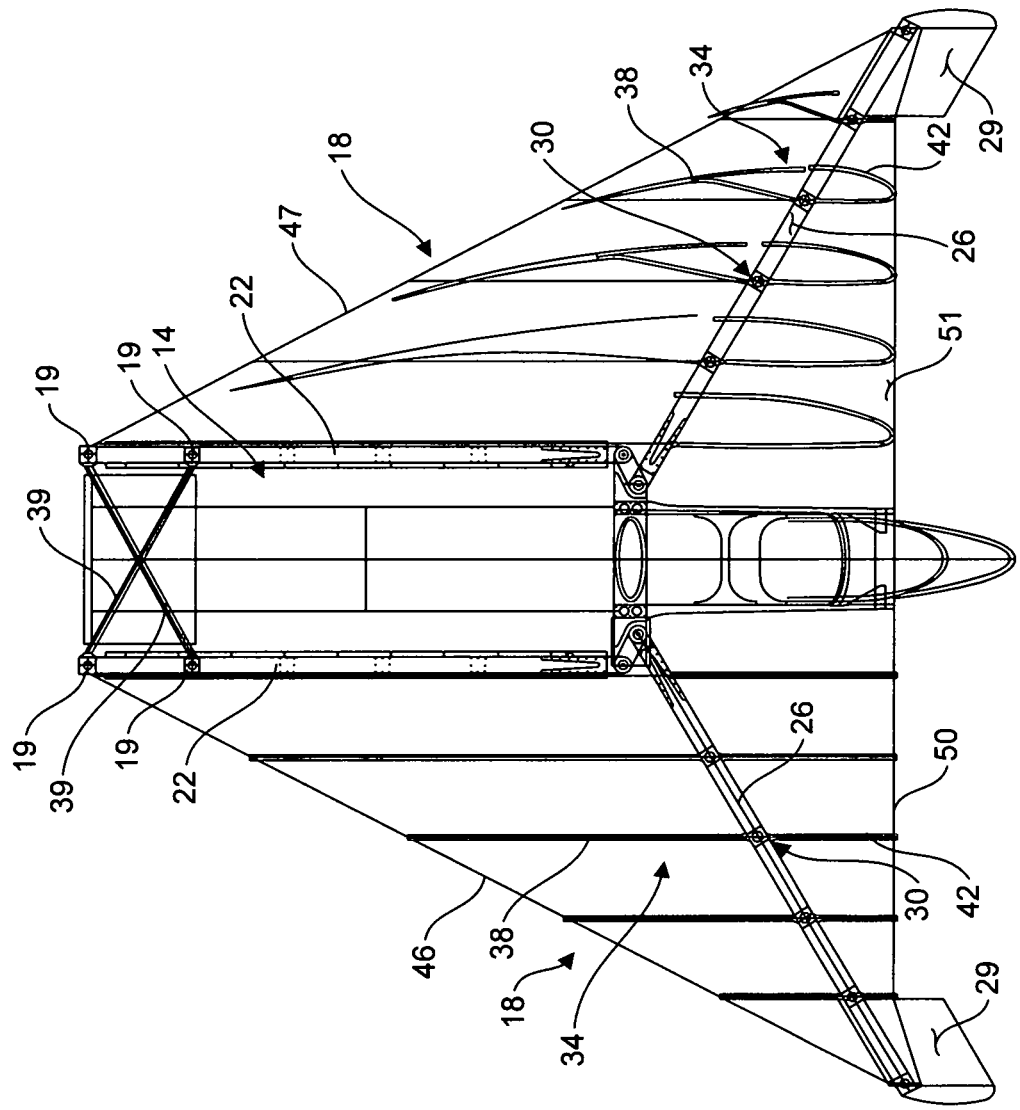
FIG. 4 is a top plan view of another embodiment of the flying vehicle with the wings fully expanded into a position for the vehicle to be flown.
Figure 5:
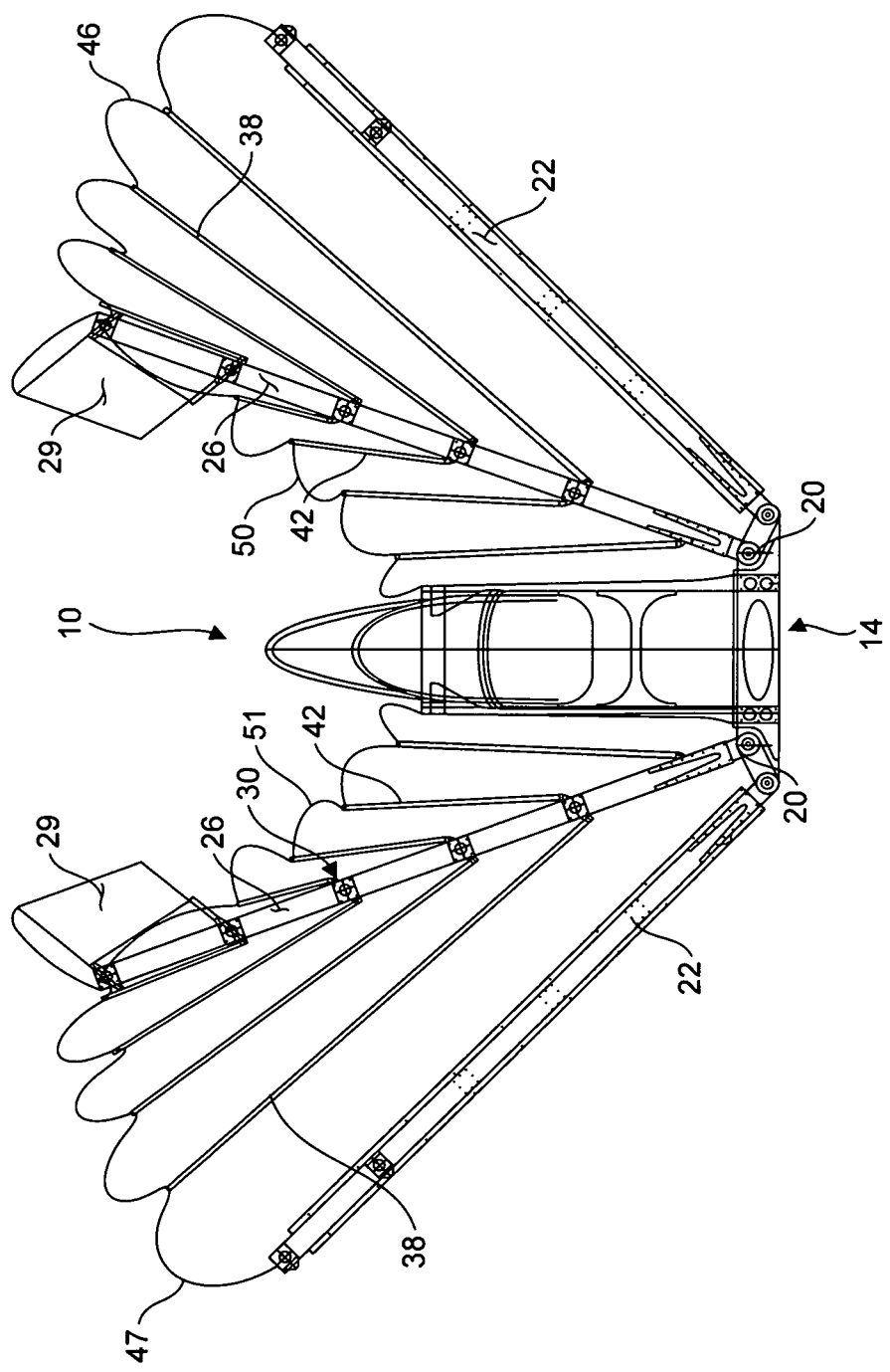
FIG. 5 is a top plan view of the embodiment of the flying vehicle in FIG. 4 in the process of having its wings (including their associated wing spars) being pivoted forward, along with the fuselage arms, so the vehicle will be in a position for storage or transporting.
Figure 6:
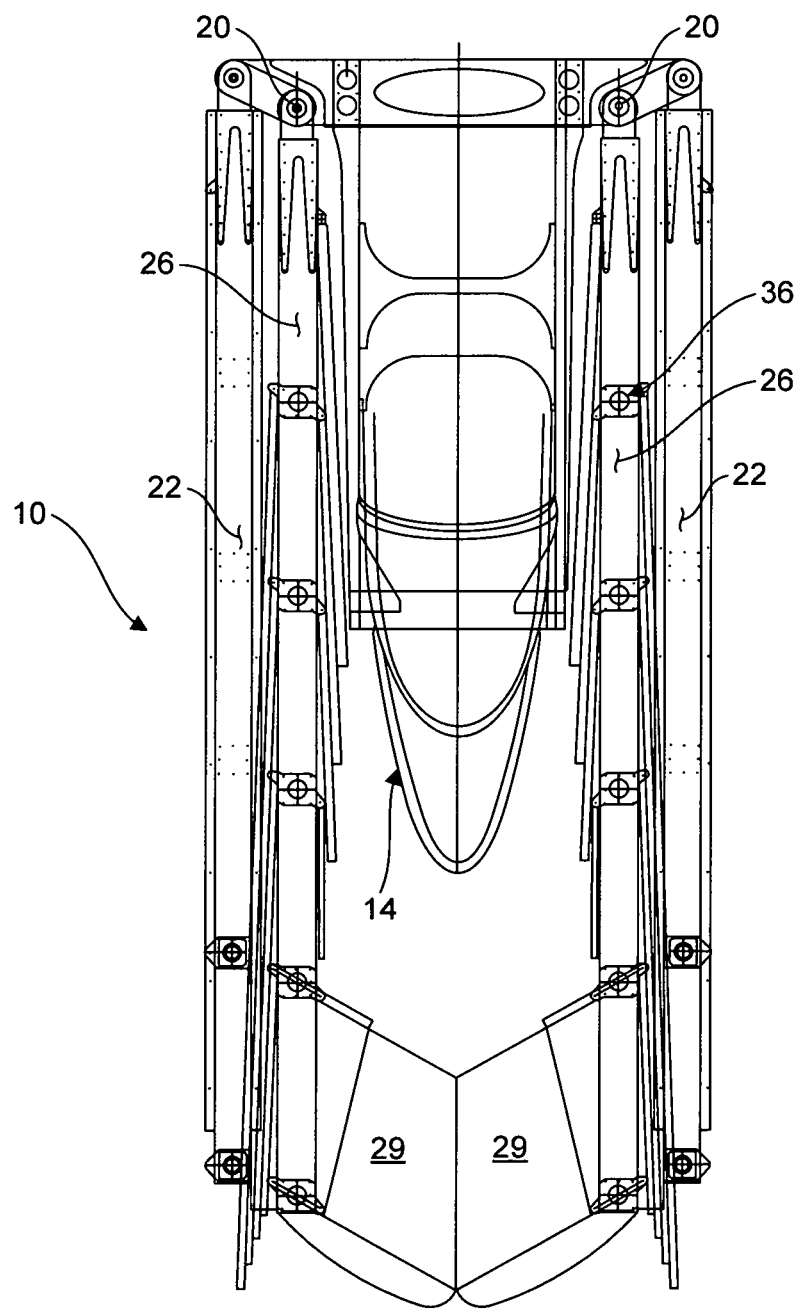
FIG. 6 is a top plan view of the flying vehicle in FIGS. 4 and 5 after the wing spars and the fuselage arms have been completely pivoted forward into a position where the wing spars and the fuselage arms are resting generally fully against the body of the vehicle in a generally parallel position with respect to each other.

Referring now to FIGS. 4-9, there is seen another embodiment of the vehicle 10, wherein similar parts of embodiments of the invention illustrated in FIGS. 1-3, are identified by like reference numerals in FIGS. 4-9. FIG. 4 is a top plan view of the embodiment of the vehicle 10 having its associated wings 18-18 fully expanded into a position for the vehicle 10 to be flown. The fuselage arms 22-22 are shown as supporting coupling plates 19-19-19-19 where to fuselage-arm connecting members 39-39-39-39 secure in a crisscross fashion or disposition to securely hold the wings 18-18 when the vehicle 10 flies. FIG. 5 is a top plan view of the vehicle 10 in FIG. 4 in the process of having its wings 18-18 (including their associated wing spars 26-26) being pivoted forward, along with the fuselage arms 22-22, so the vehicle 10 will be in a position for storage or transporting. FIG. 6 is a top plan view of the embodiment of the vehicle 10 in FIGS. 4 and 5 after the wing spars 26-26 and the fuselage arms 22-22 have been completely pivoted forward into a position where the wing spars 26-26 and the fuselage arms 22-22 are resting generally against the body 14 of the vehicle 10 in a generally parallel position with respect to each other. The wing tip members 29-29 may be coupled together (as shown) for storage or transport purposes.

Figure 7:
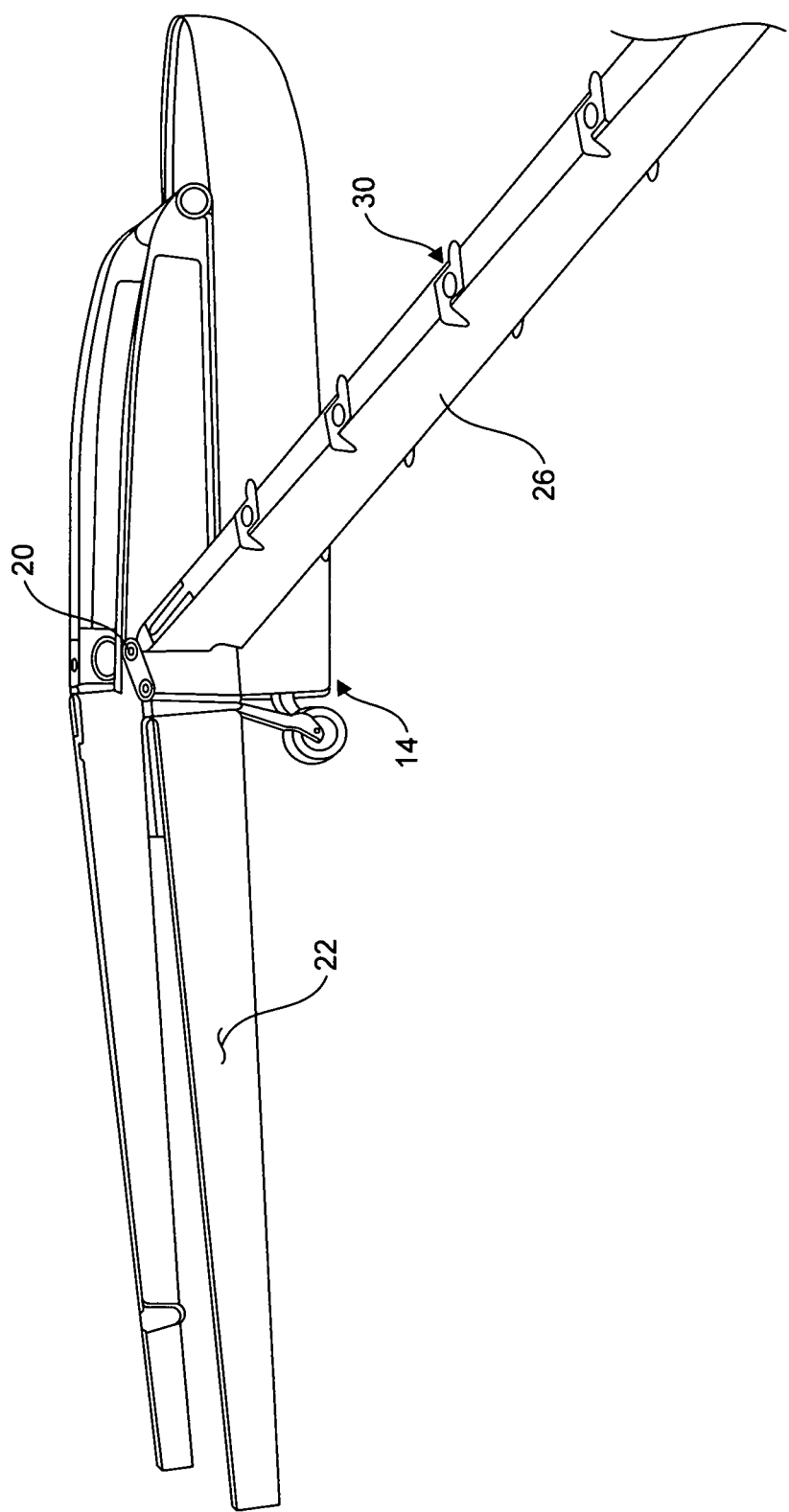
FIG. 7 is a perspective illustration of the embodiment of the vehicle of FIGS. 4-6 showing the wing spars and the fuselage arms alone, without the rib assemblies.
Figure 8:
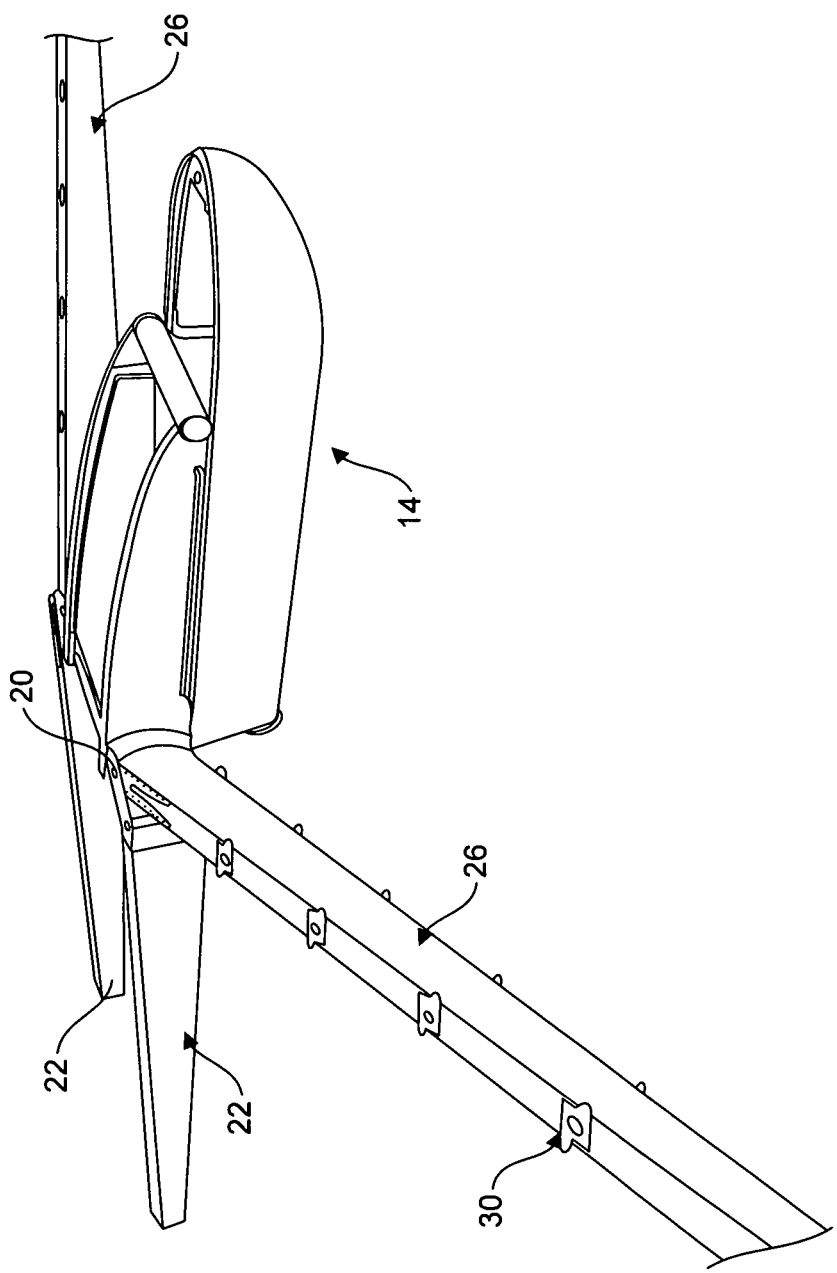
FIG. 8 is another perspective illustration of the vehicle embodiment shown in FIG. 7.
Figure 9:
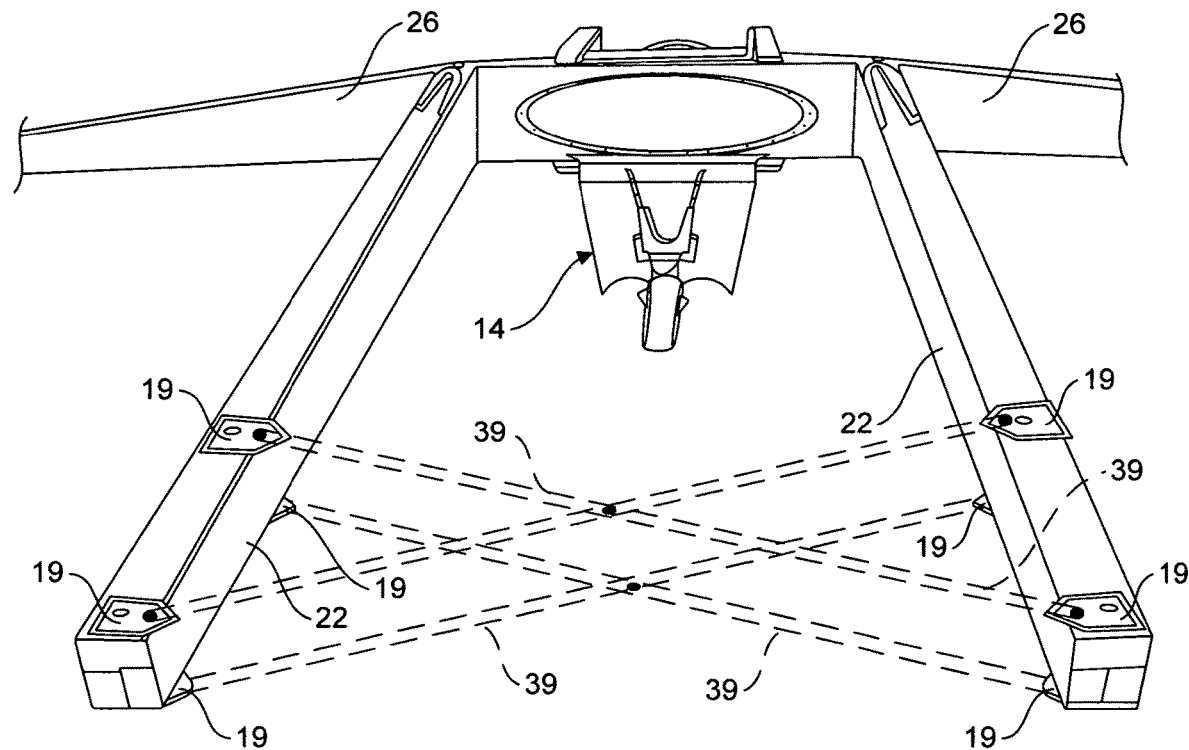
FIG. 9 is a rear perspective illustration of the embodiment of the vehicle shown in FIGS. 7 and 8.

FIG. 7 is a perspective illustration of the embodiment of the vehicle of FIGS. 4-6 showing the wing spars 26-26 and the fuselage arms 22-22 alone, without the rib assemblies 34. FIG. 8 is another perspective illustration of the embodiment of the vehicle 10 shown in FIG. 7. FIG. 9 is a rear perspective illustration of the embodiment of the vehicle 10 shown in FIGS. 7 and 8, illustrating the fuselage arms 22-22 supporting in a stationary posture coupling plates 19-19-19-19 to which fuselage-arm connecting members 39-39-39-39 (shown as dashed lines) connect in a crisscross fashion in order to securely hold the wings 18-18 when the vehicle 10 is in flight.

Referring now to FIGS. 10-18, there is seen in FIG. 10 a perspective view of part of the wing spar 26 supporting a hinge assembly 30 represented structurally as a pair of opposed plate members 31-31 having a structure including a pair of lugs 33-33 containing lug openings 35-35.

FIG. 11 is a vertical sectional view showing the hinge assembly 30 coupled via hinge pins 62-62-62-62 to the trailing wing rib 38 and the leading wing rib 42. As shown, hinge pins 62-62-62-62 pass through lug openings 35-35-35-35. Hinge assembly 30 has a top hinge plate 66 and a lower hinge plate 70, both of which are connected to wing spar 26. Hinge pins 62-62-62-62 provide pivot points for the trailing wing rib 38 and the leading wing rib 42.

FIG. 12 is another vertical sectional view through the wing spar 26 showing the hinge assembly 30 pivotally coupled to the trailing wing rib 38 and the leading wing rib 42 via hinge pins 62-62-62-62. The front cable 50 is shown connected to the front or leading wing rib 42. Similarly, the rear cable 46 is shown connected to the rear wing rib 38.

Figure 13:
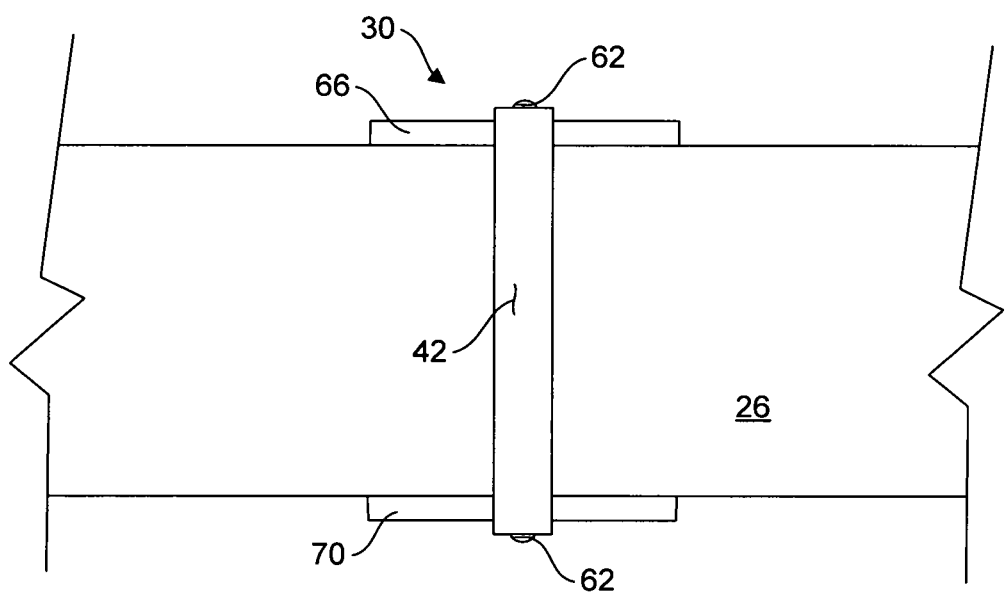
FIG. 13 is a side elevational view showing a leading (front) wing rib pivotally coupled to a top hinge plate and to a bottom hinge plate, with both hinge plates being mounted to and supported by a wing spar.

FIG. 13 is a side elevational view showing the leading wing rib 42 pivotally coupled to the top hinge plate 66 and to the bottom hinge plate 70, with both plates 66 and 70 being mounted to and supported by the wing spar 26.

Figure 14:
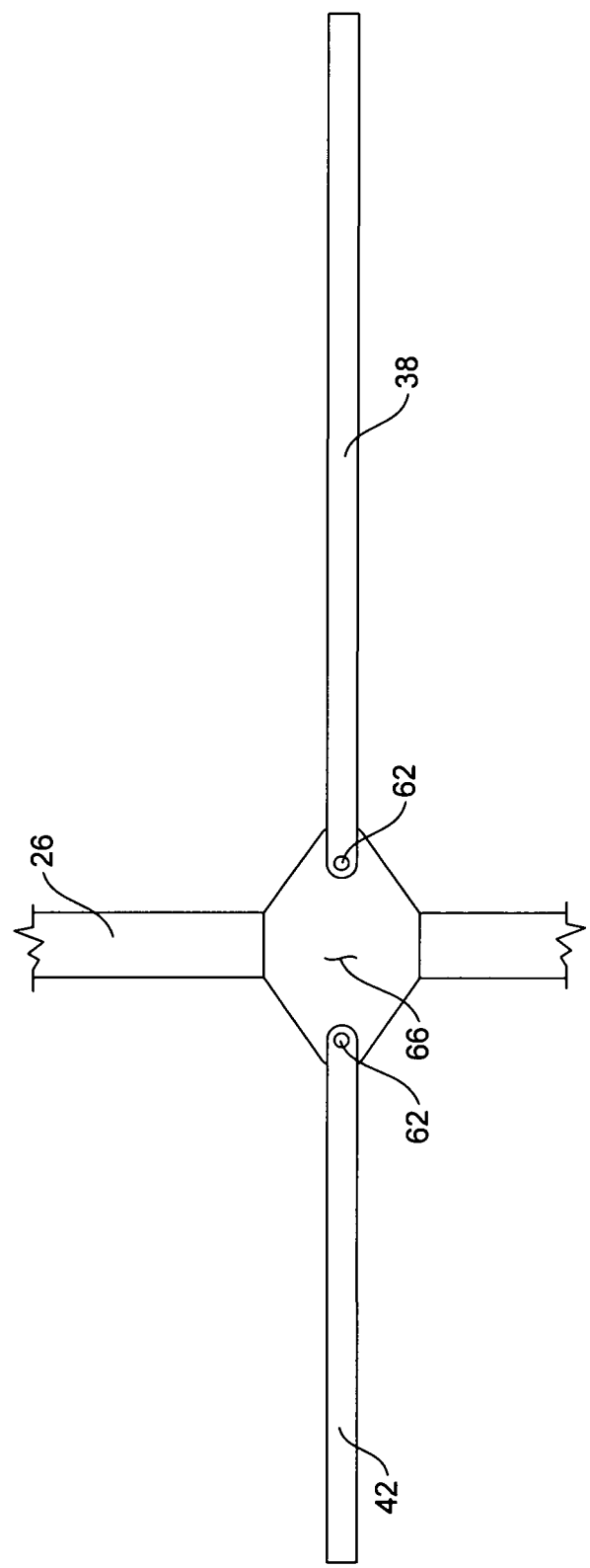
FIG. 14 is a top plan view showing a leading (front) wing rib and a trailing (rear) wing rib pivotally coupled to a top hinge plate which is mounted to a wing spar.

FIG. 14 is a top plan view showing the leading wing rib 42 and the trailing wing rib 38 pivotally coupled to the top hinge plate 66 which is mounted to the wing spar 26.

FIG. 15 is a bottom plan view showing a leading (front) wing rib 42 and a trailing (rear) wing rib 38 pivotally coupled to a bottom hinge plate 70 which is mounted to a wing spar 26.

FIG. 16 is a side elevational view of a wing spar 26 (represented cross-sectionally) supporting top and bottom hinge plates 66, 70, showing the hinge plates 66 and 70 pivotally coupled to a trailing (rear) wing rib 38 and a leading (front) wing rib 42 via hinge pins 62.

Figure 17:
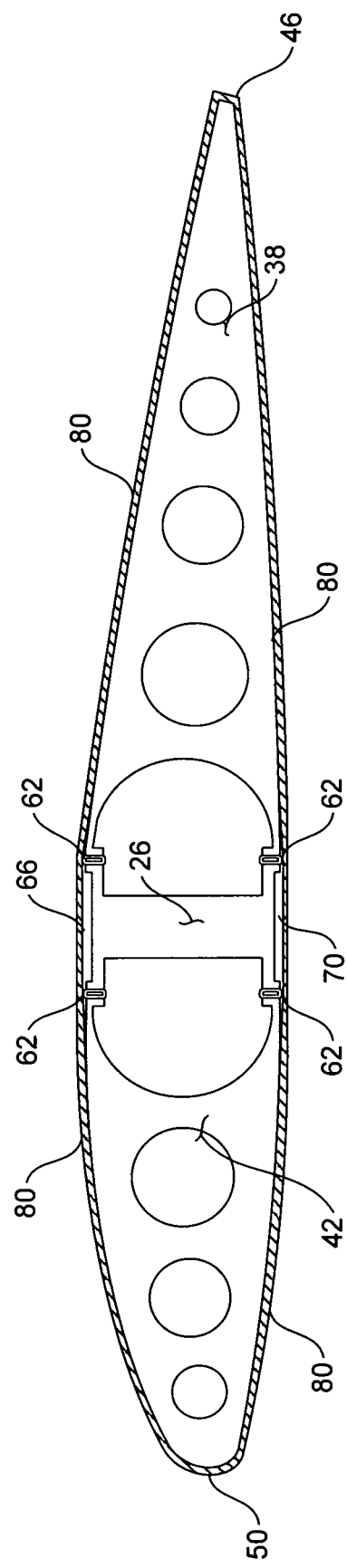
FIG. 17 is a side elevational view of a leading or front wing rib and a trailing or rear wing rib pivotally connected to a top and a bottom plate by hinge pins, and a canvas fabric material covering the wing ribs and a wing spar which supports the top and bottom plates.

FIG. 17 is a side elevational view of a leading or front wing rib 42 and a trailing or rear wing rib 38, pivotally connected to a top plate 66 and a bottom plate 70 by hinge pins 62. The canvas fabric material 80 is shown as covering and/or encapsulating wing ribs 38 and 42, the wing spar 26, as well as the top and bottom plates 66, 70 supported by the wing spar 26.

Figure 18:
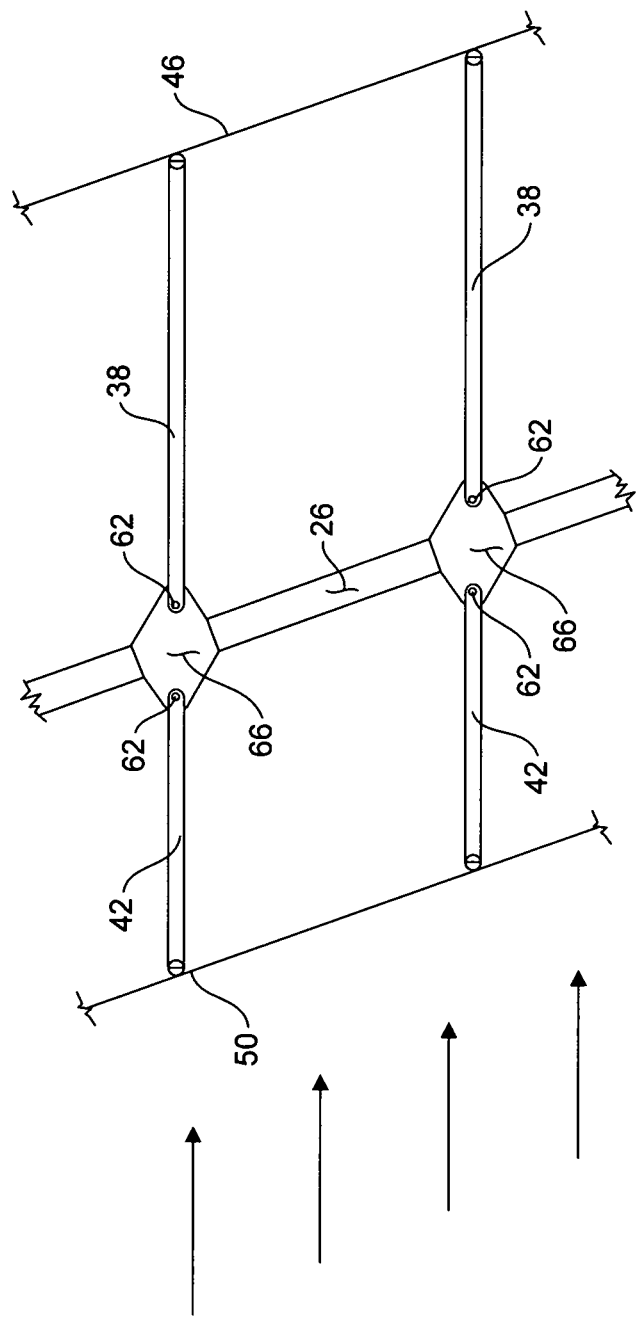
FIG. 18 is a partial top plan view of an embodiment of the invention showing the wing ribs mounted parallel to the flow of air over the wings, and with the wing spar mounted at a wing sweep (non-normal) angle.

FIG. 18 is a partial top plan view of an embodiment of the invention showing the wing ribs 42 and 38 mounted parallel to the flow of air (represented by the arrows) over the wings 18 when the vehicle 10 is flying or gliding. The wing spar 26 is mounted at a wing sweep (non-normal) angle with respect to the direction of the flow of air when the vehicle 10 is flying or gliding. Stated another way, the wing spar 26 is coupled to the body 14 of the vehicle 10 in a non-perpendicular or non-normal position (not at 90 degrees).

Referring now to FIGS. 19-26 for another embodiment of the vehicle 10, there is seen a pair of fuselage platforms 160-160 generally integrally connected to the body 14 of the vehicle 10. Fuselage platform 160 has an oblique distal edge 161 (a plane along edge 160 forms an acute angle with body 14), against which a fuselage arm 90 on the wing 18 is supported and rests when the wing 18 is coupled to the fuselage platform 160 by the cable release assembly 120 (releasably) engaging a cable release joint 130 situated on an end of the fuselage arm 90. The other end of the fuselage arm 90, end 93, pivotally connects to a hinge assembly 94 at point 147.

Figure 25:
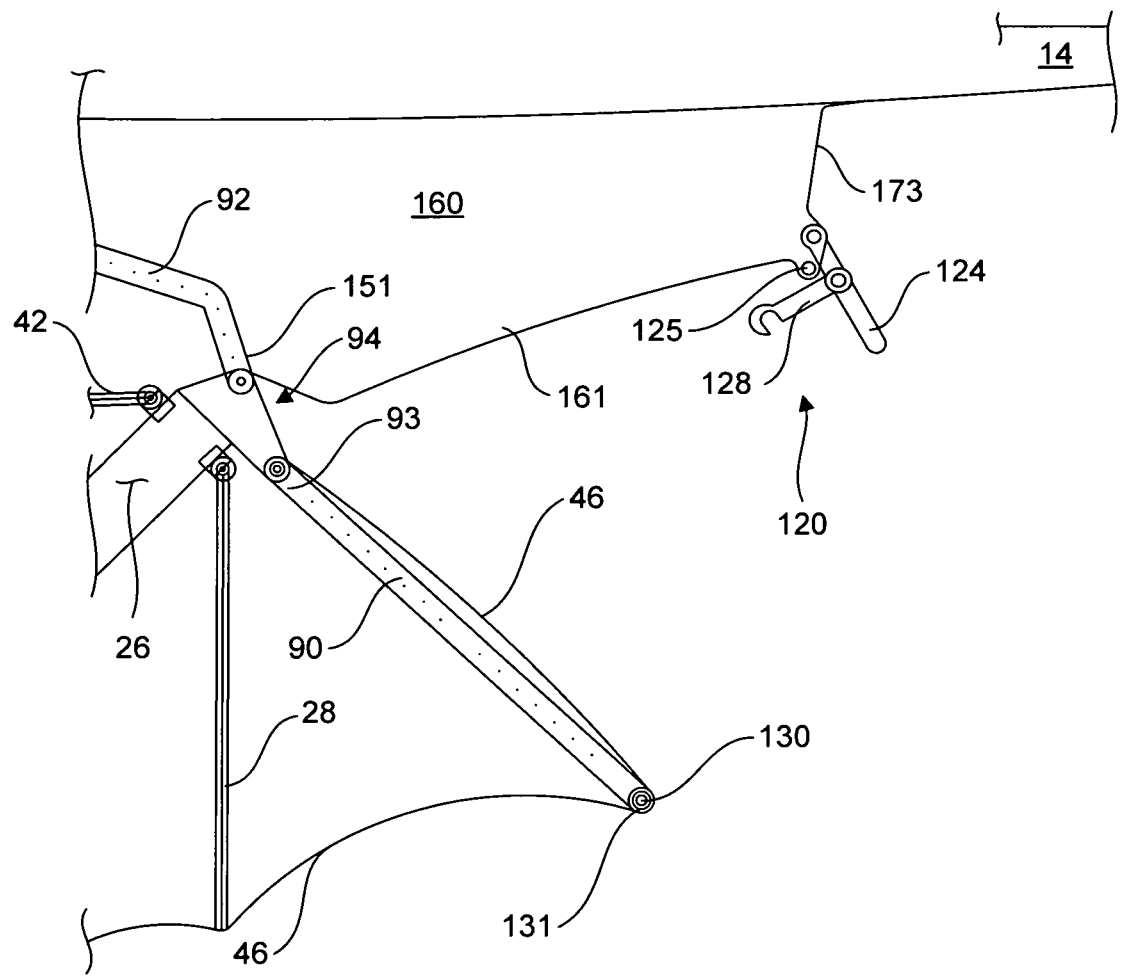
FIG. 25 is an elevational view of an embodiment of the cable release assembly not engaged to the cable release joint on a wing.
Figure 26:
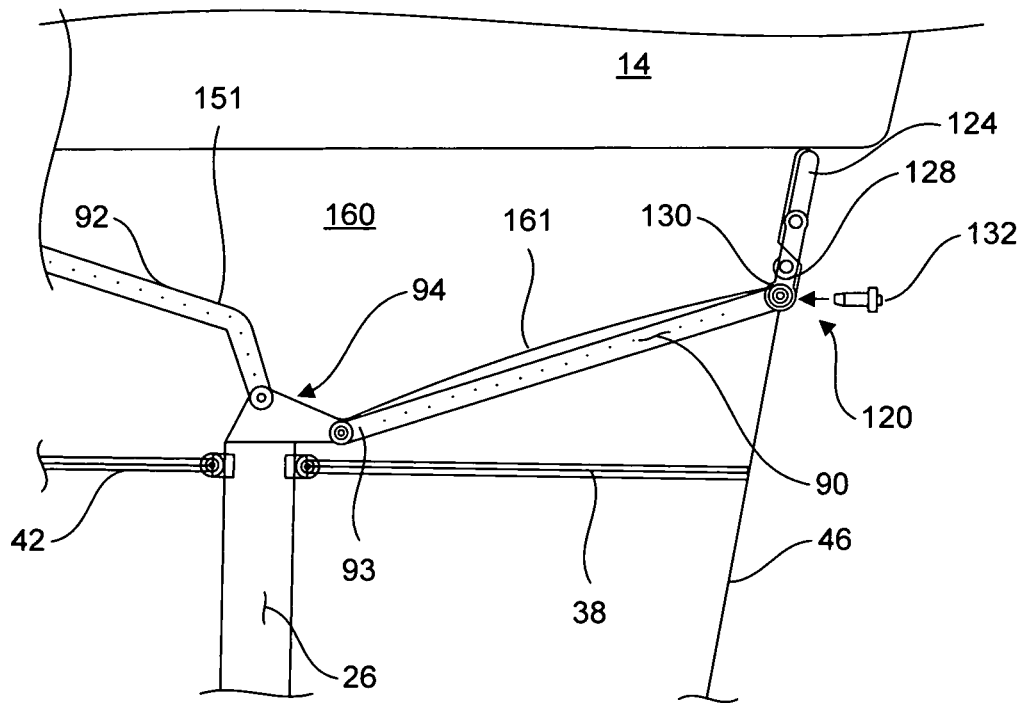
FIG. 26 is an elevational view of the cable release assembly shown in FIG. 25 coupled to the cable release joint on a wing.

As best shown in FIGS. 25 and 26, cable release assembly 120 includes a cable toggle handle 124, a cable toggle hook 128 pivotally secured to toggle handle 124 for engaging the release joint 130, and a locking pin 132 which slidably passes through aperture 125 in fuselage platform 160 and aperture 131 (see FIG. 25) in cable release joint 130. This "toggle" design tensions the cable 47 (and cable 46 on the other wing 18 when another, second cable release assembly 120 is employed with the other wing 18) and aligns the apertures 125 and 131 for slidably receiving the locking pin 132.

Fuselage platform 160 also has an obliquely skewed edge 151 (see FIGS. 25 and 26) to which fuselage arm 92 connects. Alternatively, fuselage arm 92 may be integrally formed as part of the platform 160 to define edge 151. Fuselage arm 92 pivotally connects to hinge assembly 94 at point 149 (see FIGS. 19 and 21). Hinge assembly 94 is situated between fuselage arms 90 and 92, and at a generally intermediary location on fuselage platform 160, between sides 171 and 173 of fuselage platform 160. Fabric 80 may be conveniently connected to fuselage arms 90 and 92, as best shown in FIGS. 22 and 23.

Figure 20:
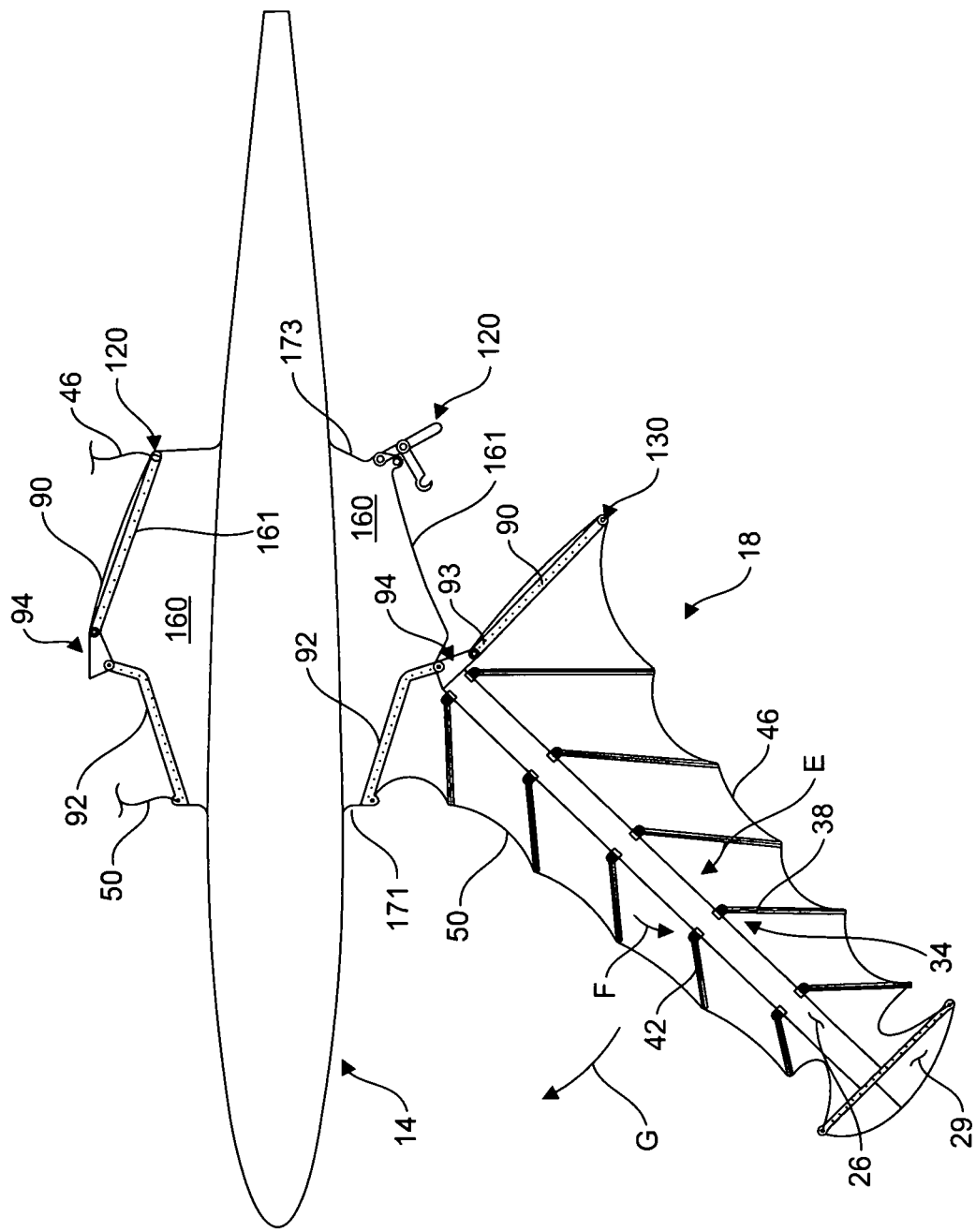
FIG. 20 is a top plan view of the embodiment of the flying vehicle in FIG. 19, with the wing in the process of being pivoted forward in direction of the arrow and about hinge assembly after the cable release joint has released the cable for releasing tension, allowing the cable to become less taut so the wing ribs are allowed to commence pivoting toward the wing spar and towards each other.
Figure 21:
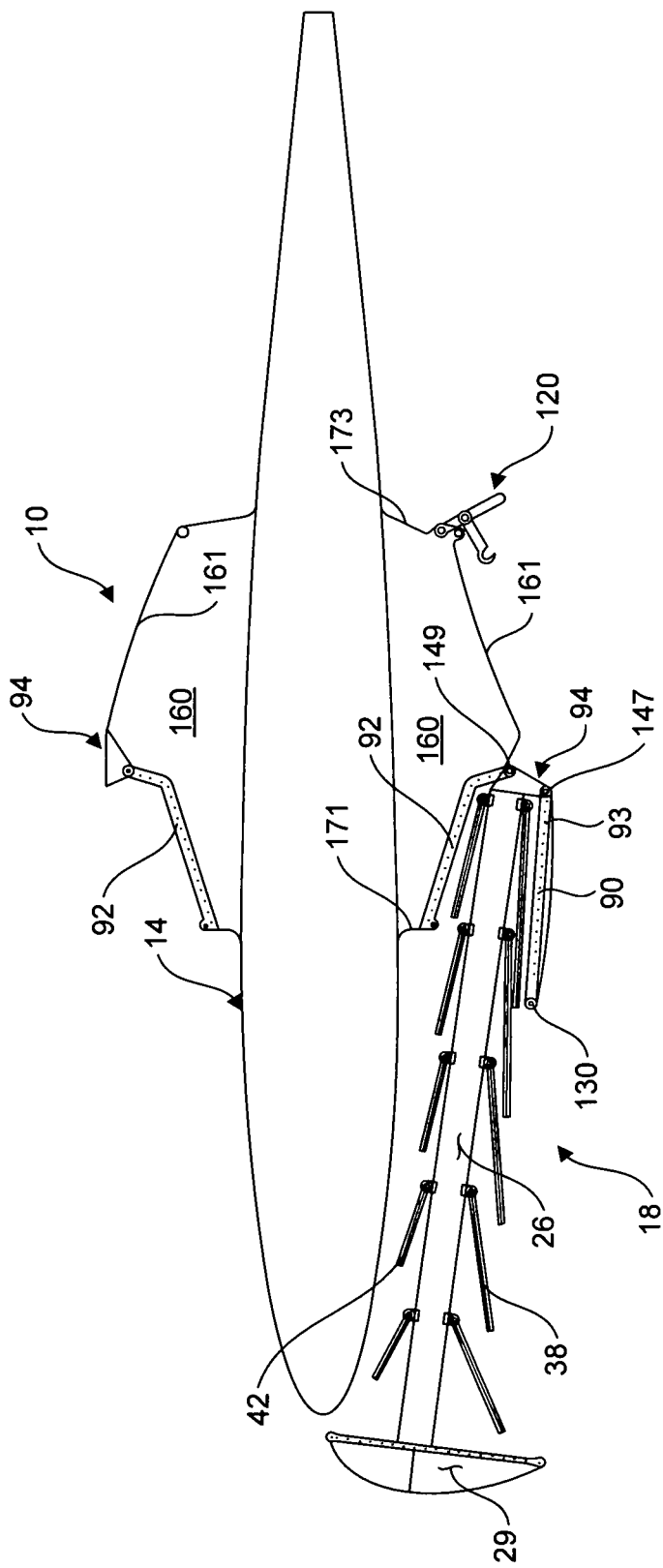
FIG. 21 is a top plan view of the embodiment of the wing in FIGS. 19 and 20 after the wing has been pivoted fully forward and generally against or in close proximity to the front of the body of the vehicle.

Referring now to FIG. 20, there is seen a top plan view of the embodiment of the wing 18 in the process of being pivoted forward about hinge assembly 94 after the cable release assembly 120 has released the cable 46, allowing the cable 46 to become less taut so the wing ribs 38 and 42 are allowed to commence respectively pivoting in direction of arrows E and F, toward the wing spar 26 and towards each other (see FIG. 20). The wing spar 26, including all components associated with wing spar 26 (e.g. rib assemblies 34 and wing tip member 29), move in direction of arrow G which points in the same direction of arrow E. Arrows E and F point in opposite directions to each other. Thus, an embodiment of the invention includes collapsing the wings 18-18 by pivoting the wing spar 26 (which is connected to the hinge assembly 94) at a generally intermediary location on the fuselage platform 160 situated between fuselage arms 90 and 92 and between sides 171 and 173 of fuselage platform 160. FIG. 21 is a top plan view of the embodiment of the wing 18 after the wing 18 has been pivoted fully forward and against the front of the body 14 of the vehicle 10.

Figure 19:
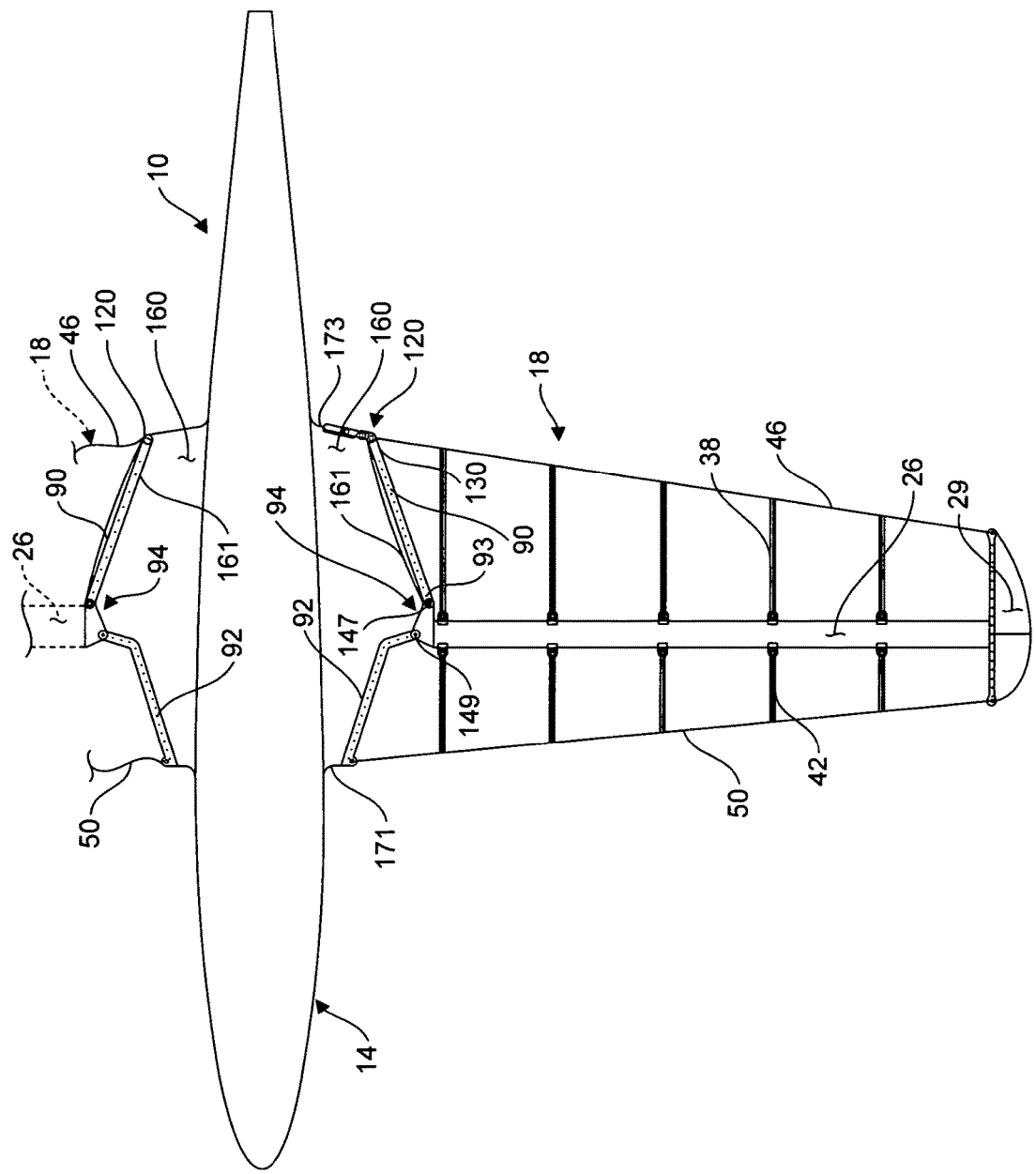
FIG. 19 is a top plan view of another embodiment of the flying vehicle illustrating a pair of fuselage platforms, attached to and protruding from the body of the flying vehicle, with a wing showing a fuselage arm pivotally coupled to a hinge assembly, and a cable release joint where a cable is releasably coupled so that when the cable is disconnected at the cable release joint, the wing is capable of being moved forward for collapsing the wing against the front of the body of the vehicle.
Figures 22, 23:
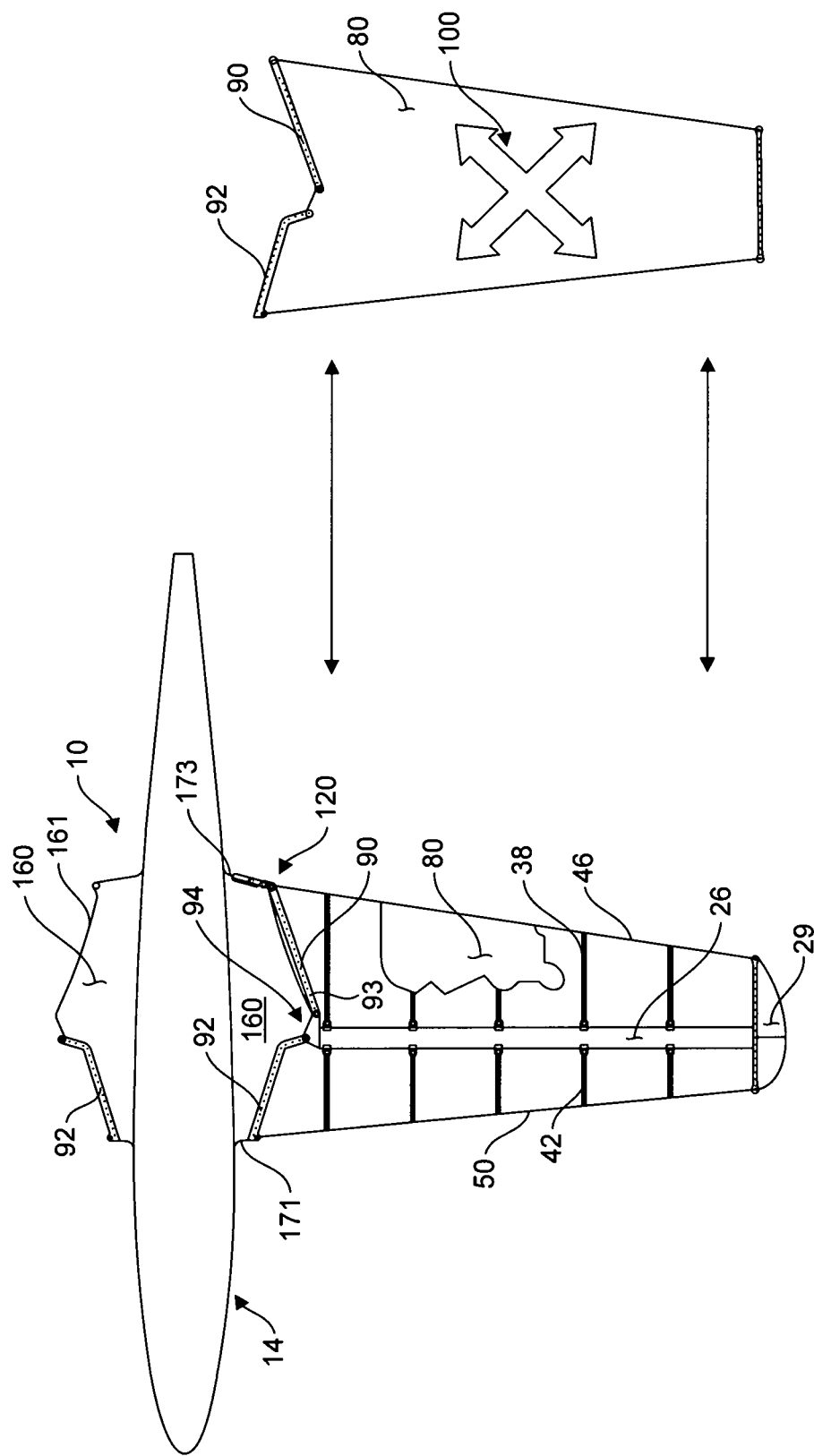
FIG. 22 is a top plan view of the embodiment of the wing shown in FIG. 19 having a partial top plan view of the canvas fabric covering and encapsulating the wing.
FIG. 23 is a top plan view of the canvas wing fabric after being removed from the wing, and illustrating the wing fabric as being a diagonally weaved, or twill weaved, fabric.

Referring now to FIG. 22, there is seen a top plan view of the embodiment of the wing 18 shown in FIG. 19 illustrating the wing fabric 80 as being a diagonally waved, or twill weaved, fabric, generally illustrated as 100. It is known that a twill or diagonally weave is a type of textile weave with a pattern of diagonal parallel ribs (in contrast with plain weave). This is done by passing the weft thread over one or more warp threads, then under two or more warp threads and so on, with a "step," or offset, between rows to create the characteristic diagonal pattern. Twill or diagonally weaved fabrics technically have a front and a back side, unlike plain weave, whose two sides are the same. The front side of the twill is called the technical face and the back the technical back. The technical face side of a twill weave fabric is the side with the most pronounced wale. FIG. 24 is a top plan view of the embodiment of the wing 18 being covered with diagonally-woven wing fabric 80.

Continuing to refer to the drawings for operation of an embodiment of the invention pertaining to folding or collapsing of fabric-covered wings 18-18 of the vehicle 10 so the vehicle 10 may be readily stored, fuselage arms 22-22 are disconnected, effectively decoupling rear cables 46 and 47 from each other. Subsequently, wing spars 26-26 are pivoted in opposite directions, about pivot points 20-20 and towards the front of the vehicle 10. As best shown in FIG. 2, this enables the pivoting of the front wing ribs 42 on one wing 18 (e.g., the port wing 18), as well as the rear wing ribs 38 on the other wing 18 (e.g., the starboard wing 18) in direction of arrow A. This also enables the pivoting of the rear wing ribs 38 on one wing 18 (e.g., the starboard wing 18), as well as the front wing ribs 42 on the other wing 18 (e.g., the port wing 18) in direction of arrow B, which is a direction opposite to the direction represented by arrow A. The wing tip member 29 on the starboard wing 18 is pivoted in direction of arrow A. The wing tip member 29 on the port wing 18 is pivoted in direction of arrow B. The pivoting continues until the rear wing ribs 38 and the front wing ribs 42 are generally parallel with the respective wing spars 26 supporting ribs 38 and 42, as best shown in FIG. 3. The wing tip members 29-29 may be coupled together (e.g., see FIG. 6).

For operation of the embodiment of the invention illustrated in FIGS. 19-26, the procedure for collapsing the port and starboard fabric-covered wings 18 is the same. Explaining the procedure to collapse and fold the port wing 18, and referencing FIG. 20, there is seen a top plan view of the embodiment of the port wing 18 in the process of being pivoted forward about port hinge assembly 94 after the cable release assembly 120 on the port side of the vehicle 10 has released the port cable 46, allowing the port cable 46 to become less taut so the port wing ribs 38 and 42 are allowed to commence respectively pivoting in direction of arrows E and F, toward the port wing spar 26 and towards each other (see FIG. 20). The port wing spar 26, including all components associated with port wing spar 26 (e.g. port rib assemblies 34 and port wing tip member 29), move in direction of arrow G which points in the same direction of arrow E. Arrows E and F point in opposite directions to each other. The pivoting of the port wing spar 26 is at a generally intermediary location on the port fuselage platform 160 situated between port fuselage arms 90 and 92 and between sides 171 and 173 of port fuselage platform 160. FIG. 21 is a top plan view of the embodiment of the wing 18 after the wing 18 has been pivoted fully forward and against the front of the body 14 of the vehicle 10.

Thus, by practice of embodiments of the present invention, a plurality of wing ribs are arranged in the air flow direction of the aircraft. Each wing rib is spaced along the wing spar according to the structural requirements of the aircraft. The wing spar is oriented at the sweep angle of the wing plan form shape. The leading and trailing edges of the wings have cables (or tension strap material) that ties each wing rib together. Front wing ribs are tied to the leading edge cable, and the trailing ribs are tied to the trailing cable. These cables hold the wing ribs in a flight position when tensioned, and allow the ribs to freely hinge into a collapsed position when the cables are released. The fabric covering the wings has fibers oriented in diagonal directions. This fiber orientation prevents the assembly from parallelograming, thus maintaining the wing plane form shape. The fabric covering is mounted to root and wing tips with a hemmed cleat. The fabric has attachment locations to other parts of the wing structure with considerations to allow the fabric to crease and bunch up during wing folding.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Additionally, any directional arrows in the drawings/ Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for collapsing fabric-covered wings of an aircraft comprising:
    (a) providing an aircraft including a first fabric-covered wing assembly having at least one first rib assembly supported by a first wing spar, and a second fabric-covered wing assembly having at least one second rib assembly supported by a second wing spar;
    (b) decoupling a first cable member of the first fabric-covered wing assembly from a second cable member of the second fabric-covered wing assembly;
    (c) pivoting at least one front wing rib of the at least one first rib assembly in a first direction;
    (d) pivoting at least one rear wing rib of the at least one first rib assembly in a second direction which is a direction opposite to the first direction;
    (e) pivoting at least one front wing rib of the at least one second rib assembly in the second direction; and
    (f) pivoting at least one rear wing rib of the at least one second rib assembly in the first direction.

2. The method of claim 1 additionally comprising providing a first wing tip member coupled to the first wing spar; and pivoting the first wing tip member in the second direction.

3. The method of claim 2 additionally comprising providing a second wing tip member coupled to the second wing spar; and pivoting the second wing tip member in the first direction.

4. The method of claim 3 additionally comprising coupling the first wing tip member to the second wing tip member.

5. The method of claim 1 additionally comprising pivoting the first wing spar in the second direction.

6. The method of claim 5 wherein said pivoting of said at least one front wing rib and of said at least one rear wing rib of the at least one first rib assembly continues until said at least one front wing rib and said at least one rear wing rib of the at least one first rib assembly are disposed generally parallel to said first wing spar.

7. The method of claim 1 additionally comprising pivoting the second wing spar in the first direction.

8. The method of claim 7 wherein said pivoting of said at least one front wing rib and of said at least one rear wing rib of the at least one second rib assembly continues until said at least one front wing rib and said at least one rear wing rib of the at least one second rib assembly are disposed generally parallel to said second wing spar.

9. The method of claim 1 wherein said decoupling of the first cable member from the second cable member comprises disconnecting a first fuselage arm from a second fuselage arm.

10. An aircraft comprising:
    (a) a wing ship body having a first wing spar and a second wing spar pivotally coupled thereto;
    (b) at least one first wing-rib assembly coupled to the first wing spar, said at least one first wing-rib assembly comprising at least one first front rib member and at least one first rear rib member;
    (c) at least one second wing-rib assembly coupled to the second wing spar, said at least one second wing-rib assembly comprising at least one second front rib member and at least one second rear rib member;
    (d) a first rear cable secured to the at least one first rear rib member;
    (e) a first front cable secured to the at least one first front rib member;

(f) a second rear cable secured to the at least one second rear rib member; and (g) a second front cable secured to the at least one second front rib member.

11. The aircraft of claim 10 wherein said at least one first front rib member being adapted for pivoting in a first direction, and said at least one first rear rib member being adapted for pivoting in a second direction which is a direction opposite to the first direction.

12. The aircraft of claim 10 wherein said at least one second front rib member being adapted for pivoting in the second direction, and said at least one second rear rib member being adapted for pivoting in the first direction.

13. The aircraft of claim 10 additionally comprising a first fuselage arm and a second fuselage arm, pivotally coupled to the wing ship body.

14. The aircraft of claim 13 wherein said first rear cable and said second rear cable are respectively connected to said first fuselage arm and said second fuselage arm.

15. The aircraft of claim 10 additionally comprising a first wing tip member pivotally secured to the first wing spar and a second wing tip member pivotally secured to the second wing spar; and said first front cable and said first rear cable are connected to the first wing tip member; and said second front cable and said second rear cable are connected to the second wing tip member.

16. The aircraft of claim 10 additionally comprising a first fabric covering at least a portion of the first wing spar and the at least one first wing-rib assembly; and a second fabric covering at least a portion of the second wing spar and the at least one second wing-rib assembly.

17. The aircraft of claim 10 wherein said aircraft comprises an aircraft selected from the group consisting of a wing-in-ground-effect wing ship, an aerial drone, a flying boat, an airplane, and a lifting body aircraft.

18. A flying vehicle comprising:

(a) a wing ship body;

(b) a first fuselage platform connected to the wing ship body, said first fuselage platform having a first oblique distal edge and a first hinge member pivotally secured thereto at a location contiguous to the first oblique distal edge;

(c) a second fuselage platform connected to the wing ship body, said second fuselage platform having a second oblique distal edge and a second hinge member pivotally secured thereto at a location contiguous to the second oblique distal edge;

(d) a first fuselage arm pivotally secured to the first hinge member;

(e) a second fuselage arm pivotally secured to the second hinge member;

(f) a first wing spar connected to the first hinge member;

(g) a second wing spar connected to the second hinge member;

(h) a first coupling assembly pivotally connected to the first fuselage platform for releasably engaging and coupling with the first fuselage arm;

(i) a second coupling assembly pivotally connected to the second fuselage platform for releasably engaging and coupling with the second fuselage arm;

(j) at least one first wing-rib assembly coupled to the first wing spar, said at least one first wing-rib assembly comprising at least one first front rib member and at least one first rear rib member;

(k) at least one second wing-rib assembly coupled to the second wing spar, said at least one second wing-rib assembly comprising at least one second front rib member and at least one second rear rib member;

(l) a first rear cable secured to the at least one first rear rib member;

(m) a first front cable secured to the at least one first front rib member;

(n) a second rear cable secured to the at least one second rear rib member; and (o) a second front cable secured to the at least one second front rib member.

19. The flying vehicle of claim 18 wherein said first rear cable engages said first fuselage arm; and said second rear cable engages said second fuselage arm.

20. The flying vehicle of claim 19 additionally comprising a first fabric covering at least a portion of the first wing spar and the at least one first wing-rib assembly; and a second fabric covering at least a portion of the second wing spar and the at least one second wing-rib assembly.

* * * * *